(12) United States Patent
Cipolli et al.

(10) Patent No.: US 9,179,160 B2
(45) Date of Patent: Nov. 3, 2015

(54) SYSTEMS AND METHODS FOR ERROR RESILIENCE AND RANDOM ACCESS IN VIDEO COMMUNICATION SYSTEMS

(71) Applicant: Vidyo, Inc., Hackensack, NJ (US)

(72) Inventors: Stephen Cipolli, Nanuet, NY (US); Reha Civanlar, Istanbul (TR); Alexandros Eleftheriadis, Tenafly, NJ (US); Jonathan Lennox, Jersey City, NJ (US); Roi Sasson, New York, NY (US); Manoj Saxena, Monroe Township, NJ (US); Ofer Shapiro, Fair Lawn, NJ (US)

(73) Assignee: Vidyo, Inc., Hackensack, NJ (US)

( * ) Notice: Subject to any disclaimer, the term of this patent is extended or adjusted under 35 U.S.C. 154(b) by 0 days.

(21) Appl. No.: 14/664,488

(22) Filed: Mar. 20, 2015

(65) Prior Publication Data

US 2015/0264378 A1  Sep. 17, 2015

Related U.S. Application Data

(63) Continuation of application No. 11/608,776, filed on Dec. 8, 2006, now Pat. No. 9,077,964.

(60) Provisional application No. 60/748,437, filed on Dec. 8, 2005, provisional application No. 60/778,760, filed on (Continued)

(51) Int. Cl.
*H04N 19/51* (2014.01)
*H04N 19/65* (2014.01)
(Continued)

(52) U.S. Cl.
CPC ............ *H04N 19/51* (2014.11); *H04N 19/166* (2014.11); *H04N 19/172* (2014.11); *H04N 19/176* (2014.11); *H04N 19/31* (2014.11); *H04N 19/463* (2014.11); *H04N 19/65* (2014.11)

(58) Field of Classification Search
None
See application file for complete search history.

(56) References Cited

U.S. PATENT DOCUMENTS 5,555,244 A  9/1996  Gupta et al.
6,148,005 A  11/2000  Paul et al.
(Continued)

FOREIGN PATENT DOCUMENTS

CA  2507825  9/2004
CA  2515354  9/2004
(Continued)

OTHER PUBLICATIONS

Reichel, et al., "Joint Scalable Video Model JSVM-4"; ITU Study Group 16—Video Coding Experts Group—ISO/IEC MPEG & ITU-T VCEG (ISO/IEC JTC1/SC29/WG11 and ITU-T SG 16 Q6), Document No. JVT-Q202, Nov. 18, 2005; Paragraphs [01.1], [02.1], [2.2], [0004]; XP030006256.
(Continued)

*Primary Examiner* — Hung Dang
*Assistant Examiner* — Sunghyoun Park
(74) *Attorney, Agent, or Firm* — Baker Botts, LLP

(57) ABSTRACT

Systems and methods for error resilient transmission and for random access in video communication systems are provided. The video communication systems are based on single-layer, scalable video, or simulcast video coding with temporal scalability, which may be used in video communication systems. A set of video frames or pictures in a video signal transmission is designated for reliable or guaranteed delivery to receivers using secure or high reliability links, or by retransmission techniques. The reliably-delivered video frames are used as reference pictures for resynchronization of receivers with the transmitted video signal after error incidence and for random access.

30 Claims, 26 Drawing Sheets

Related U.S. Application Data on Mar. 3, 2006, provisional application No. 60/787,043, filed on Mar. 29, 2006, provisional application No. 60/787,031, filed on Mar. 29, 2006, provisional application No. 60/829,618, filed on Oct. 16, 2006, provisional application No. 60/862,510, filed on Oct. 23, 2006, provisional application No. 60/814,934, filed on Jun. 19, 2006.

(51) Int. Cl.
| | |
|---|---|
| *H04N 19/166* | (2014.01) |
| *H04N 19/172* | (2014.01) |
| *H04N 19/176* | (2014.01) |
| *H04N 19/31* | (2014.01) |
| *H04N 19/463* | (2014.01) |

(56) References Cited

U.S. PATENT DOCUMENTS

| | | | |
|---|---|---|---|
| 6,167,084 | A | 12/2000 | Wang et al. |
| 6,392,705 | B1 | 5/2002 | Chaddha |
| 6,498,865 | B1 | 12/2002 | Brailean et al. |
| 6,580,754 | B1 | 6/2003 | Wan et al. |
| 6,771,703 | B1 | 8/2004 | Oguz et al. |
| 6,871,006 | B1 | 3/2005 | Oguz et al. |
| 6,912,584 | B2 | 6/2005 | Wang et al. |
| 6,937,770 | B1 | 8/2005 | Oguz et al. |
| 6,959,116 | B2 | 10/2005 | Sezer et al. |
| 6,973,622 | B1 | 12/2005 | Rappaport et al. |
| 7,146,056 | B2 | 12/2006 | Gunnewiek et al. |
| 7,359,558 | B2 | 4/2008 | Gunnewiek et al. |
| 7,400,889 | B2 | 7/2008 | Balasubramanian et al. |
| 7,421,127 | B2 | 9/2008 | Bruls et al. |
| 7,643,560 | B2 | 1/2010 | Hong et al. |
| 8,462,856 | B2 | 6/2013 | Eleftheriadis et al. |
| 8,693,538 | B2 | 4/2014 | Eleftheriadis et al. |
| 8,718,137 | B2 | 5/2014 | Eleftheriadis et al. |
| 8,804,848 | B2 | 8/2014 | Cipolli et al. |
| 8,811,492 | B2 * | 8/2014 | Boyce et al. ............. 375/240.21 |
| 8,934,530 | B2 | 1/2015 | Horowitz |
| 9,077,964 | B2 | 7/2015 | Cipolli et al. |
| 2001/0036321 | A1 | 11/2001 | Kishi |
| 2002/0001411 | A1 | 1/2002 | Suzuki et al. |
| 2002/0018484 | A1 | 2/2002 | Kim |
| 2002/0057898 | A1 | 5/2002 | Normile |
| 2002/0071485 | A1 | 6/2002 | Caglar et al. |
| 2002/0150158 | A1 * | 10/2002 | Wu et al. .................. 375/240.12 |
| 2002/0163918 | A1 | 11/2002 | Cline |
| 2003/0012279 | A1 | 1/2003 | Chaddha |
| 2003/0067872 | A1 * | 4/2003 | Harrell et al. .................. 370/229 |
| 2003/0074674 | A1 | 4/2003 | Magliaro |
| 2003/0086622 | A1 | 5/2003 | Klein Gunnewiek et al. |
| 2003/0103571 | A1 | 6/2003 | Meehan et al. |
| 2003/0112822 | A1 * | 6/2003 | Hong et al. .................... 370/469 |
| 2003/0126238 | A1 | 7/2003 | Kohno et al. |
| 2003/0133500 | A1 | 7/2003 | Auwera et al. |
| 2003/0135631 | A1 | 7/2003 | Li et al. |
| 2003/0138043 | A1 | 7/2003 | Hannuksela |
| 2004/0001479 | A1 | 1/2004 | Pounds et al. |
| 2004/0042549 | A1 | 3/2004 | Huang et al. |
| 2004/0071354 | A1 | 4/2004 | Adachi et al. |
| 2004/0170331 | A1 | 9/2004 | Henry |
| 2004/0198371 | A1 | 10/2004 | Balasubramanian et al. |
| 2004/0218816 | A1 | 11/2004 | Hannuksela |
| 2004/0252767 | A1 | 12/2004 | Bruls et al. |
| 2004/0252900 | A1 | 12/2004 | Bruls |
| 2004/0252901 | A1 | 12/2004 | Gunnewiek et al. |
| 2004/0258319 | A1 | 12/2004 | Bruls |
| 2005/0002458 | A1 | 1/2005 | Bruls et al. |
| 2005/0018771 | A1 | 1/2005 | Bourge et al. |
| 2005/0105814 | A1 | 5/2005 | Bruls et al. |
| 2005/0135477 | A1 | 6/2005 | Zhang et al. |
| 2005/0147164 | A1 | 7/2005 | Wu et al. |
| 2005/0152452 | A1 | 7/2005 | Suzuki |
| 2005/0163211 | A1 | 7/2005 | Shanableh |
| 2005/0254575 | A1 | 11/2005 | Hannuksela et al. |
| 2005/0259729 | A1 | 11/2005 | Sun |
| 2005/0265450 | A1 | 12/2005 | Raveendran et al. |
| 2006/0010269 | A1 | 1/2006 | Leibbrandt |
| 2006/0078049 | A1 | 4/2006 | Bao et al. |
| 2006/0227871 | A1 | 10/2006 | Budagavi |
| 2006/0282737 | A1 | 12/2006 | Shi et al. |
| 2007/0071090 | A1 | 3/2007 | Peng et al. |
| 2007/0086521 | A1 | 4/2007 | Wang et al. |
| 2007/0206673 | A1 | 9/2007 | Cipolli et al. |
| 2007/0230566 | A1 | 10/2007 | Eleftheriadis et al. |
| 2010/0067579 | A1 | 3/2010 | Bandoh et al. |
| 2010/0132002 | A1 | 5/2010 | Henocq et al. |
| 2010/0189181 | A1 | 7/2010 | Zheng et al. |
| 2011/0305275 | A1 | 12/2011 | Eleftheriadis et al. |
| 2012/0069135 | A1 | 3/2012 | Cipolli et al. |
| 2013/0322553 | A1 | 12/2013 | Eleftheriadis et al. |
| 2014/0192870 | A1 | 7/2014 | Eleftheriadis et al. |
| 2014/0285616 | A1 | 9/2014 | Eleftheriadis et al. |

FOREIGN PATENT DOCUMENTS

| | | |
|---|---|---|
| WO | WO 03/063505 | 7/2003 |
| WO | WO 2004/008775 | 1/2004 |

OTHER PUBLICATIONS

Stockhammer, et al., "H.264/AVC in Wireless Environments", IEEE Transactions on Circuits and Systems, for Video Technology, IEE Service Center, 13(7):657-673, (Jul. 2003) XP011099258.
U.S. Appl. No. 11/608,776, Oct. 27, 2011 Non-Final Office Action.
U.S. Appl. No. 11/608,776, Feb. 27, 2012 Response to Non-Final Office Action.
U.S. Appl. No. 11/608,776, Jun. 22, 2012 Final Office Action.
U.S. Appl. No. 11/608,776, Dec. 21, 2012 Amendment and Request for Continued Examination (RCE).
U.S. Appl. No. 11/608,776, Sep. 25, 2013 Non-Final Office Action.
U.S. Appl. No. 11/608,776, Feb. 21, 2014 Response to Non-Final Office Action.
U.S. Appl. No. 11/608,776, Jul. 31, 2014 Non-Final Office Action.
U.S. Appl. No. 11/608,776, Aug. 22, 2014 Response to Non-Final Office Action.
U.S. Appl. No. 11/608,776, Dec. 3, 2014 Final Office Action.
U.S. Appl. No. 11/608,776, Feb. 3, 2015 Amendment and Request for Continued Examination (RCE).
U.S. Appl. No. 11/608,776, Feb. 27, 2015 Non-Final Office Action.
U.S. Appl. No. 11/608,776, Mar. 24, 2015 Response to Non-Final Office Action.
U.S. Appl. No. 11/608,776, Apr. 13, 2015 Notice of Allowance.
U.S. Appl. No. 11/608,776, May 29, 2015 Issue Fee Payment.
U.S. Appl. No. 11/682,263, Jun. 23, 2011 Restriction Requirement.
U.S. Appl. No. 11/682,263, Sep. 26, 2011 Non-Final Office Action.
U.S. Appl. No. 11/682,263, Mar. 26, 2012 Response to Non-Final Office Action.
U.S. Appl. No. 11/682,263, May 8, 2012 Final Office Action.
U.S. Appl. No. 11/682,263, Dec. 13, 2012 Supplemental Amendment.
U.S. Appl. No. 11/682,263, Oct. 9, 2012 Amendment and Request for Continued Examination (RCE).
U.S. Appl. No. 11/682,263, Oct. 16, 2013 Notice of Allowance.
U.S. Appl. No. 11/682,263, Jan. 15, 2014 Issue Fee Payment.
U.S. Appl. No. 11/971,769, May 11, 2012 Non-Final Office Action.
U.S. Appl. No. 11/971,769, Jan. 22, 2013 Notice of Allowance.
U.S. Appl. No. 11/971,769, Jan. 23, 2013 Request for Continued Examination (RCE).
U.S. Appl. No. 11/971,769, Feb. 4, 2013 Notice of Allowance.
U.S. Appl. No. 11/971,769, May 3, 2013 Issue Fee Payment.
U.S. Appl. No. 11/971,769, Nov. 13, 2012 Response to Non-Final Office Action.
U.S. Appl. No. 13/209,023, Dec. 13, 2012 Preliminary Amendment.
U.S. Appl. No. 13/209,023, Dec. 18, 2013 Notice of Allowance.
U.S. Appl. No. 13/209,023, Mar. 18, 2014 Issue Fee Payment.
U.S. Appl. No. 13/238,624, Oct. 2, 2013 Non-Final Office Action.

(56) References Cited

OTHER PUBLICATIONS

U.S. Appl. No. 13/238,624, Mar. 6, 2014 Response to Non-Final Office Action.
U.S. Appl. No. 13/238,624, Mar. 31, 2014 Notice of Allowance.
U.S. Appl. No. 13/238,624, Jun. 5, 2014 Notice of Allowance.
U.S. Appl. No. 13/238,624, Jun. 27, 2014 Issue Fee Payment.
U.S. Appl. No. 13/238,624, Jul. 8, 2014 Notice of Allowance.
U.S. Appl. No. 13/018,853, Jul. 15, 2013 Non-Final Office Action.
U.S. Appl. No. 13/018,853, Jan. 15, 2014 Response to Non-Final Office Action.
U.S. Appl. No. 13/018,853, May 8, 2014 Final Office Action.
U.S. Appl. No. 13/018,853, Aug. 8, 2014 Notice of Appeal.
U.S. Appl. No. 13/018,853, Oct. 8, 2014 Amendment and Request for Continued Examination (RCE).
U.S. Appl. No. 13/018,853, Dec. 4, 2014 Notice of Allowance.
U.S. Appl. No. 13/018,853, Dec. 8, 2014 Issue Fee Payment.
U.S. Appl. No. 13/899,271, Mar. 3, 2015 Non-Final Office Action.
(ITU-T H.264) "ITU-T Recommendation H.264: Advanced Video Coding for Generic Audiovisual Services" in: International Relecommunication Union (On Line, {URL: http://www.itu.int/rec/T-Rec-H.264/en}Mar. 1, 2005 entire document.
Chen et al., "SVC Frame Loss Concealment", ITU Study Group 16—Video Coding Experts Group—ISO/IEC MPEG & ITU-T VCEG (ISO/IEC JTC1/SC29/WG11 and ITU-T SG 16 Q6), Document No. JVT-Q046, Oct. 12, 2005; XP030006207.
Eleftheriadis, et al., "Improved Error Resilience Using Temporal Level 0 Picture Index", ITU Study Group—16 Video Coding Experts Group—ISO/IEC MPEG & ITU-T VCEG, No. JVT-W062, Apr. 27, 2007, XP030007022, Entire document.
Eleftheriadis, et al., "SVC Error Resil Using Frame Index in NAL Unit Header", ITU Study Group 16—Video Coding Experts Group—ISO/IEC MPEG & ITU-T VCEG, No. JVT-V088, Jan. 10, 2007, XP030006896, Entire document.
European Office Action for EP 08705806.1, dated Mar. 25, 2013.
European Search Report issued on Aug. 3, 2010 in application No. EP08705806.1 (corresponding to US US20080165864A1).
Hannuksela, et al., "H.264/AVC in Wireless Enviroments", IEEE Transactions on Circuits and Systems, for Video Technology, IEE Service Center, vol. 13, No. 7, Jul. 1, 2003, pp. 657-673, XP011099258.
Hartung, et al., "A Real-time Scalable Software Video Codec for Collaborative Applications Over Packet Networks", ACM Multimedia Communications '98, Bristol, UK, pp. 419-426 (1998).
International Search Report and Written Opinion for PCT/US2011/023327 dated Mar. 28, 2011.
JVT: "Joint Scalable Video Model JSVM4"; ITU Study Group 16—Video Coding Experts Group—ISO/IEC MPEG & ITU-T VCEG (ISO/IEC JTC1/SC29/WG11 and ITU-T SG 16 Q6), Document No. JVT-Q202, Nov. 18, 2005; Paragraphs [01.1], [02.1], [2.2], [0004]; XP030006256.
Ohm, "Advances in Scalable Video coding", Proceedings of the IEEE, 93(1):42-56 (2005).
Partial European Search Report issued on Mar. 24, 2011 in application No. EP07757937.
Schwarz et al., "Overview of the Scalable Extension of the H.264/MPEG-4 AVC Video Coding Standard", Oct. 6, 2006, XP008108972.
Tian V Kumar MV Tampere International CTR for Signal Processing (Finland) D et al.; "Improved H.264/AVC Video Broadcast/Multicast", Visual Communications and Image Processing; Jul. 15, 2005; XP030080844.
Weigand, et al., "Joint Scalable Video Model 8: Joint Draft 8 with Proposed Changes", ITU Study Group 16—Video Coding Experts Group—ISO/IEC MPEG & ITU-T VCEG, No. JVT-U202, Dec. 13, 2006, XP030006800 (paragraphs [G.7.3.1], [G.7.4.1]-[G7.4.2]).
Wenger, "Video Redundancy Coding in H.263+", Proceedings AVSPN, pp. 1-6, (1997) (XP002966435).
Wenger, et al., "Extended RTP Profile for Real-Time Transport Control Protocol (RTCP)-Based Feedback (RTP/AVPF)", J. Ott Helsinki University of Technology, whole document (52 pages) (Jul. 1, 2006) (XP015055018).
Wenger, et al., "RTP Payload Format for H.264 Video", RFC 3984, pp. 34-47 (Feb. 1, 2005) (XP008135986).

* cited by examiner

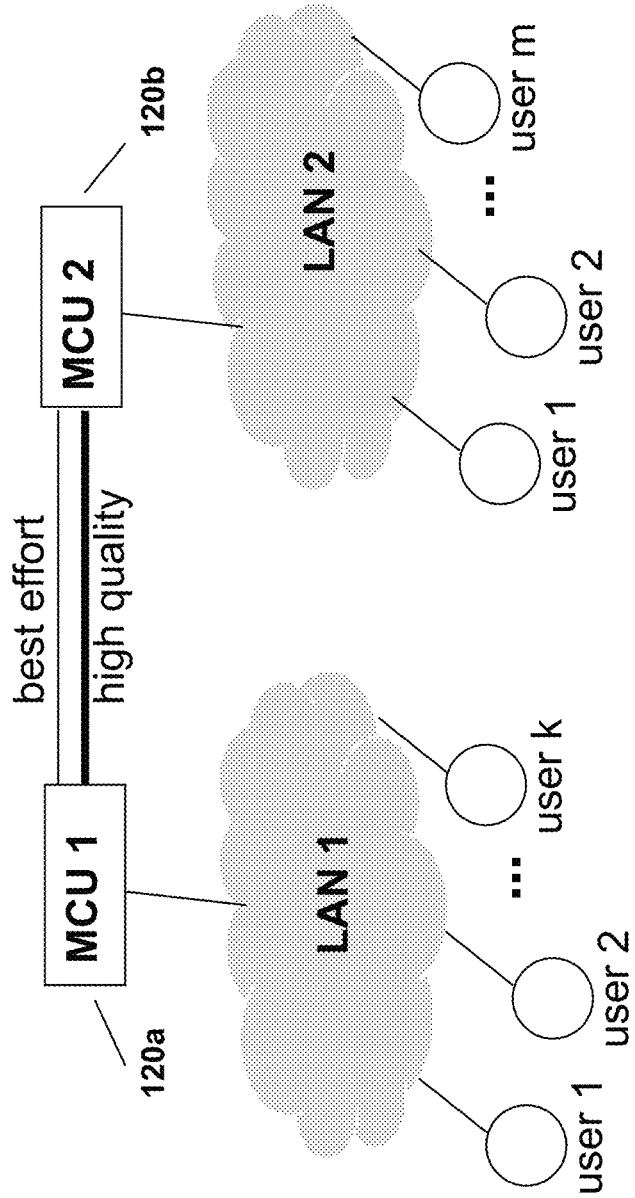
FIG. 1: VIDEOCONFERENCING SYSTEM

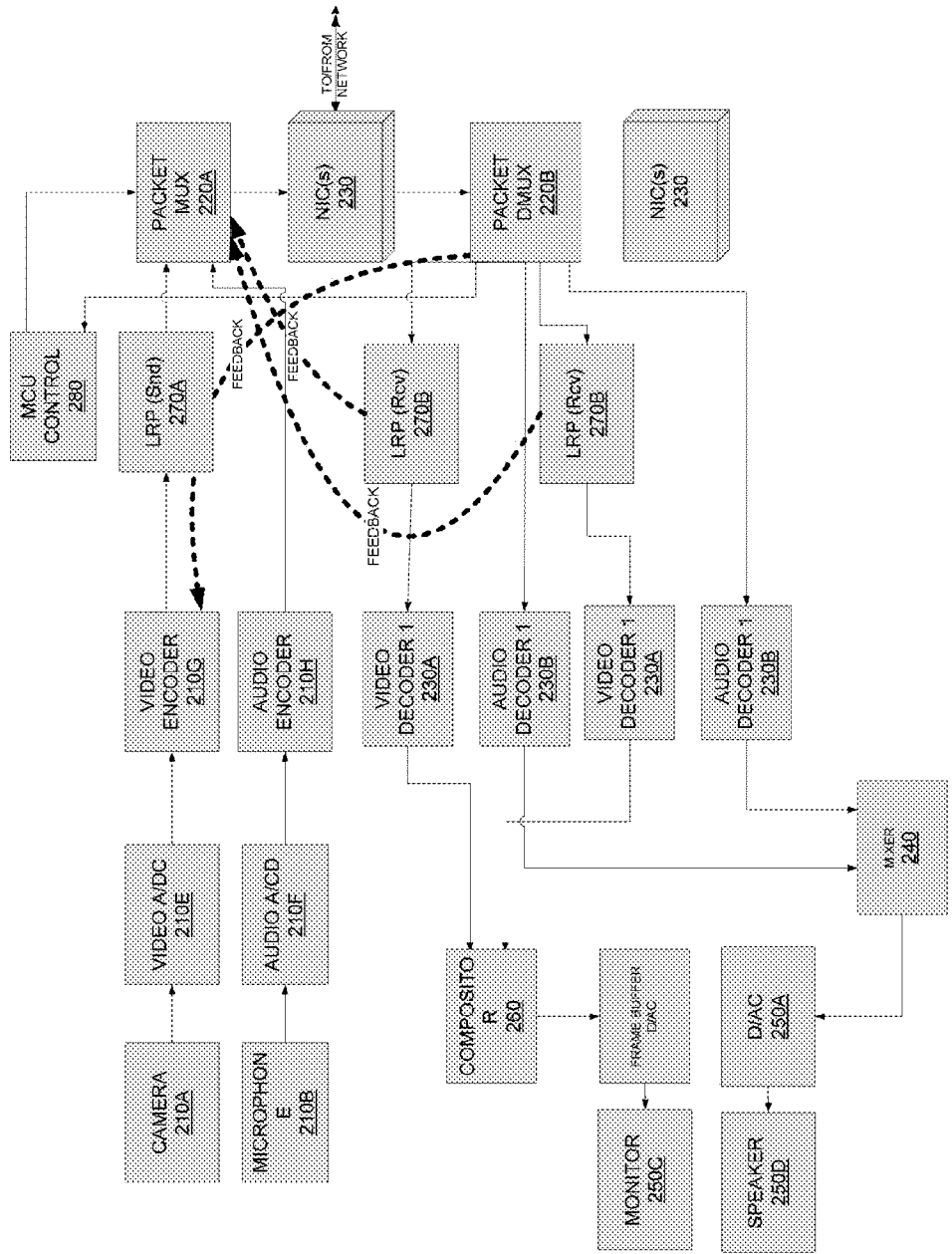
FIG. 2: END-USER TERMINAL (SINGLE LAYER CODING)
140

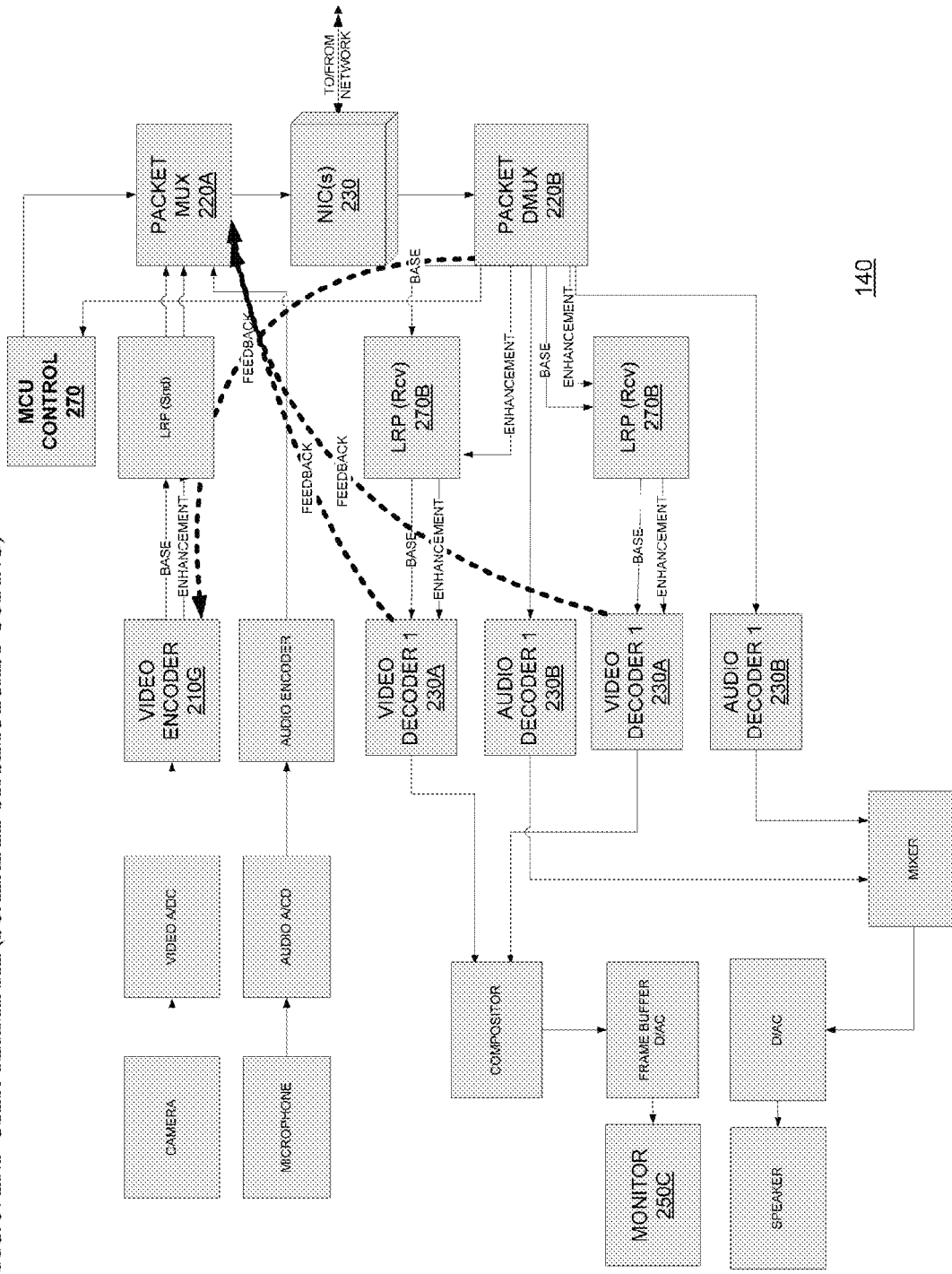
FIG. 3: END-USER TERMINAL (SCALABLE OR SIMULCAST CODING)

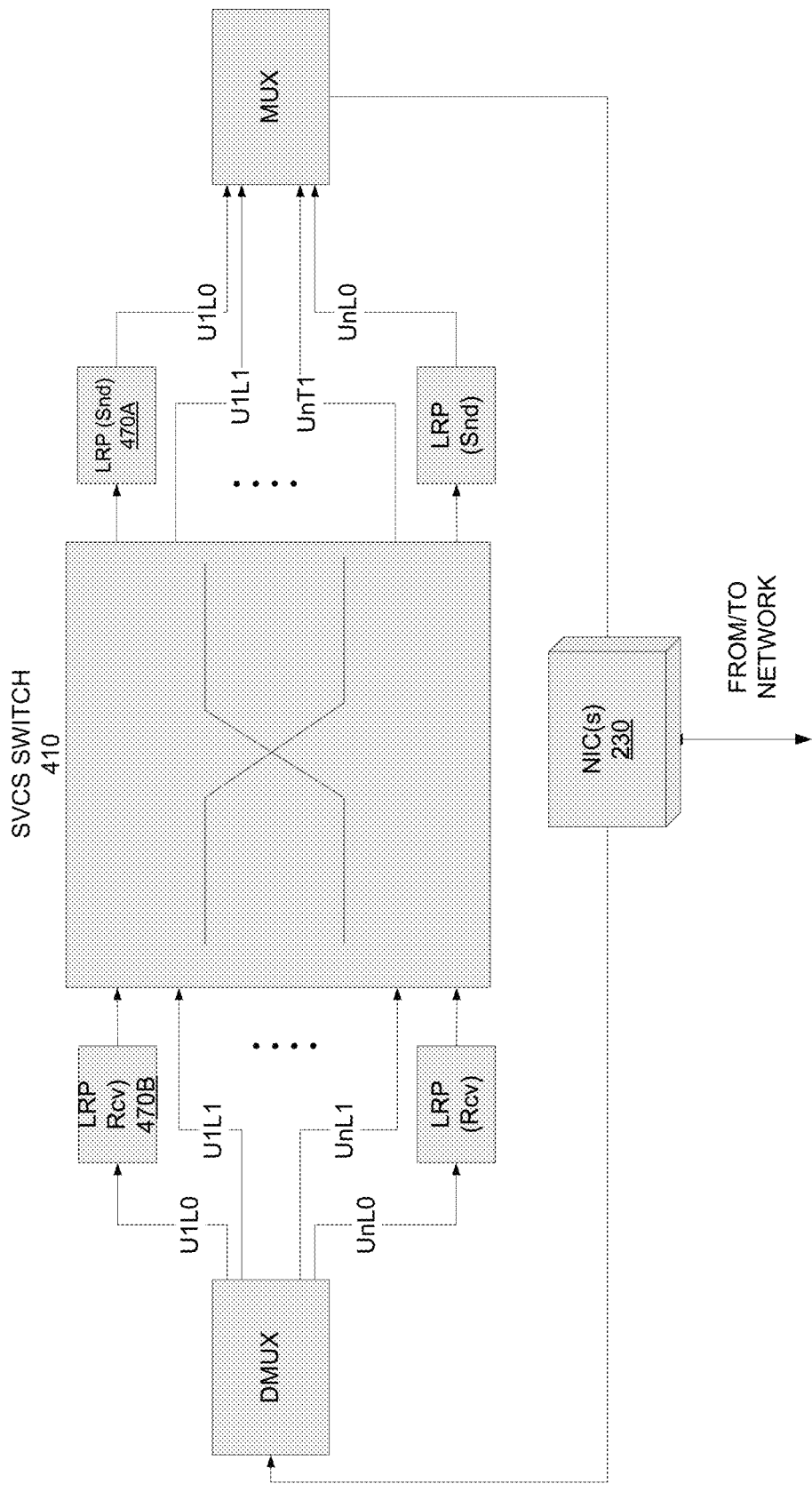
FIG. 4: SVCS

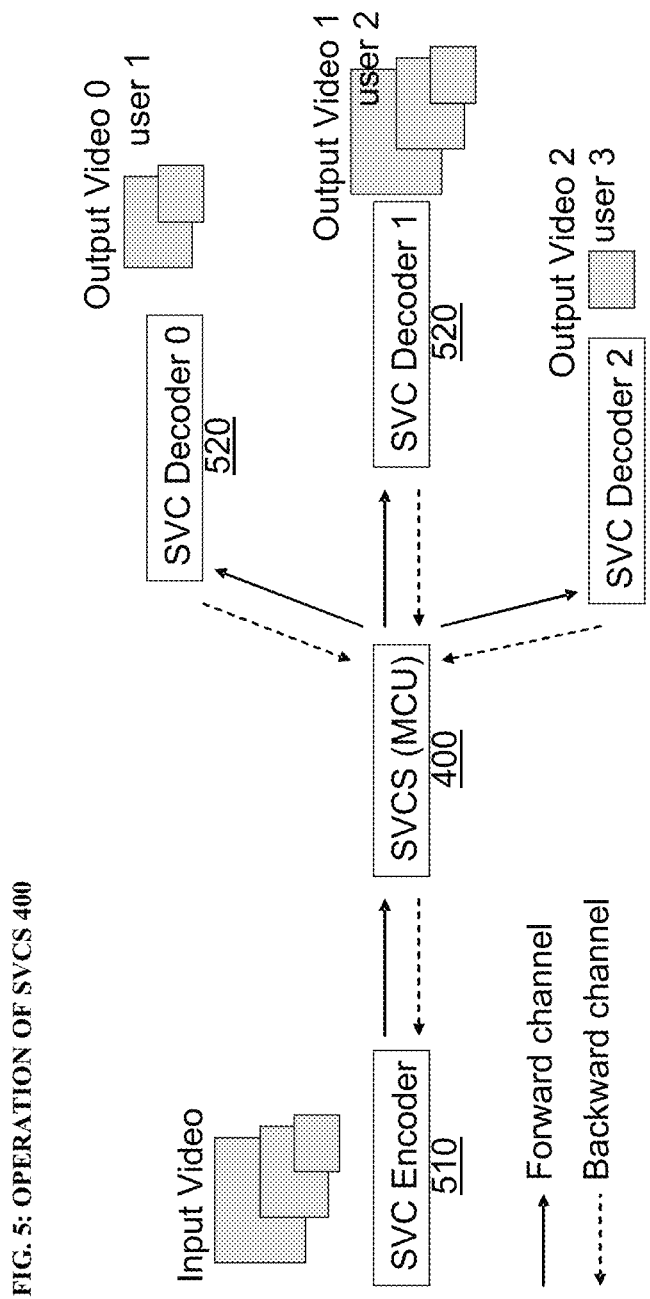
FIG. 5: OPERATION OF SVCS 400

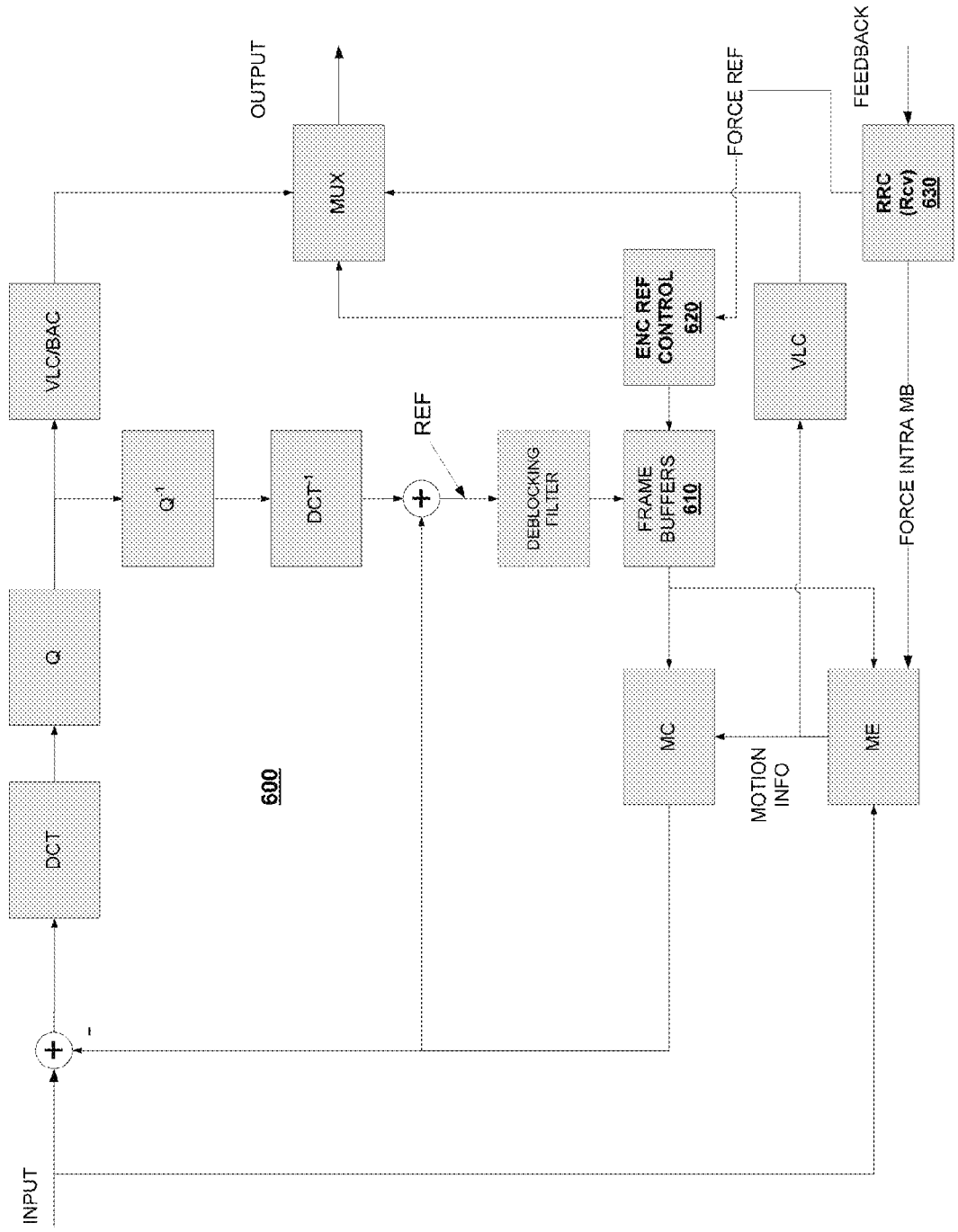
FIG. 6: VIDEO ENCODER

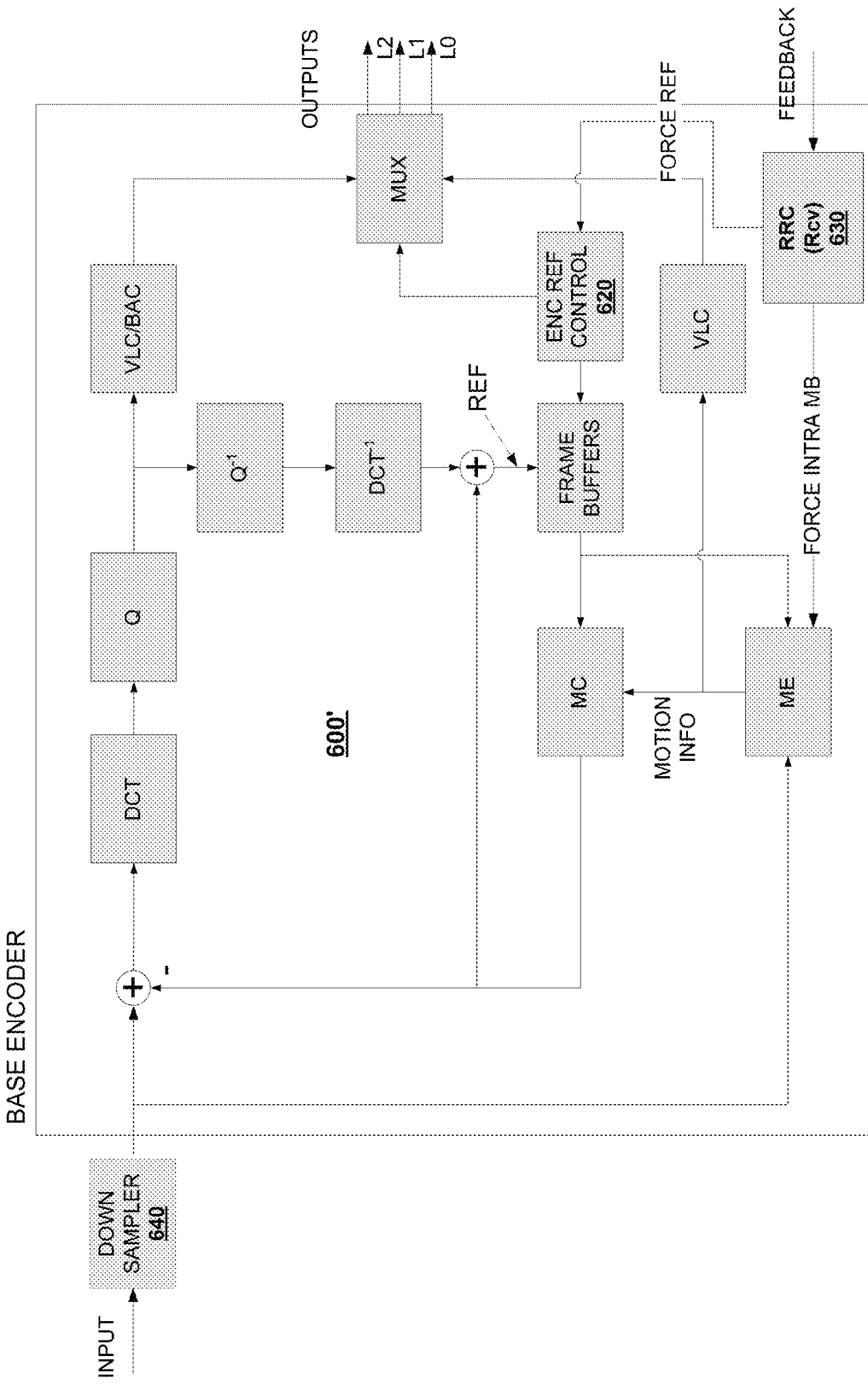
FIG. 7: VIDEO ENCODER (BASE AND TEMPORAL ENHANCEMENT LAYERS)

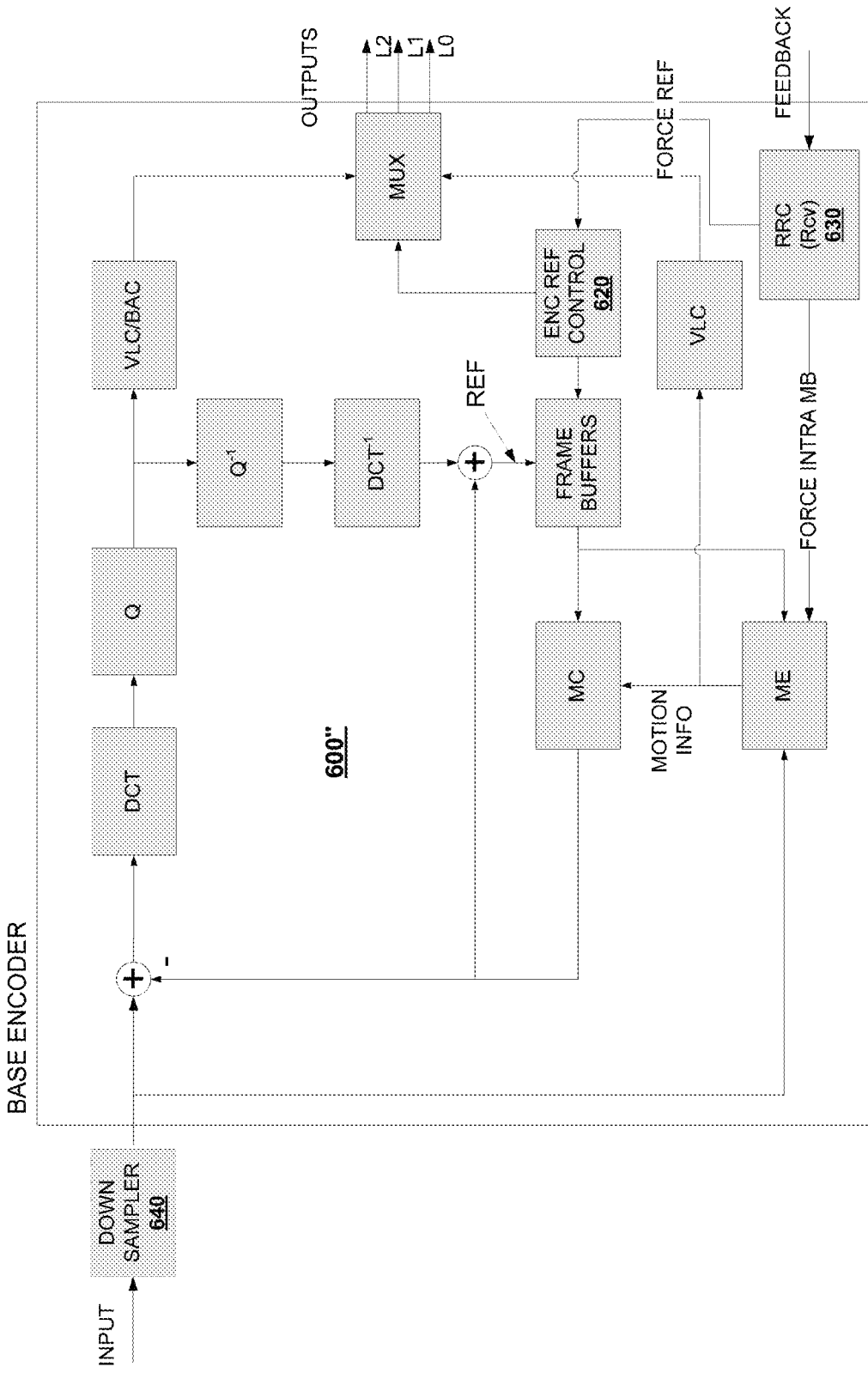
FIG. 8: SPATIAL SCALABILITY ENHANCEMENT LAYER CODEC

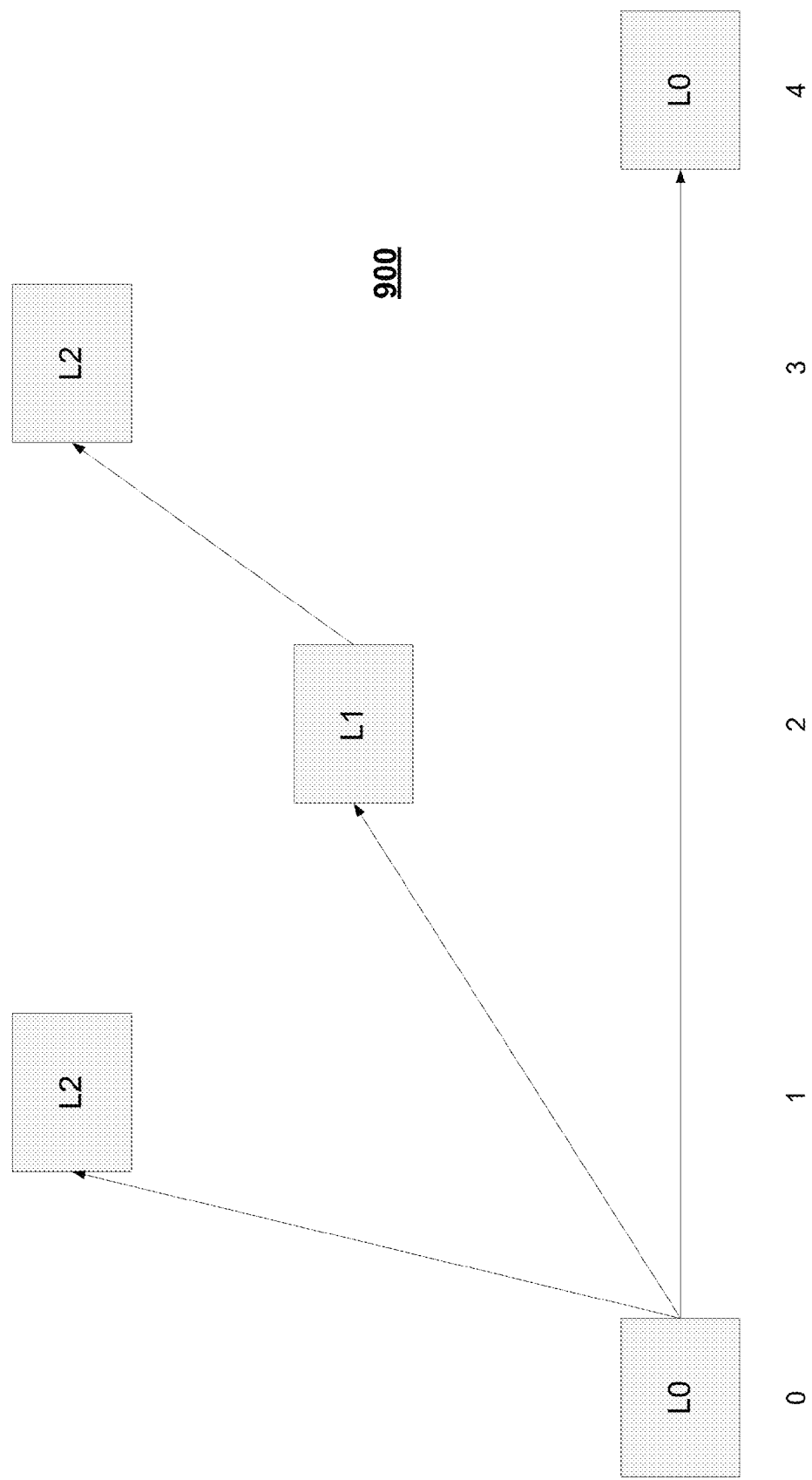
FIG. 9: PICTURE CODING STRUCTURE

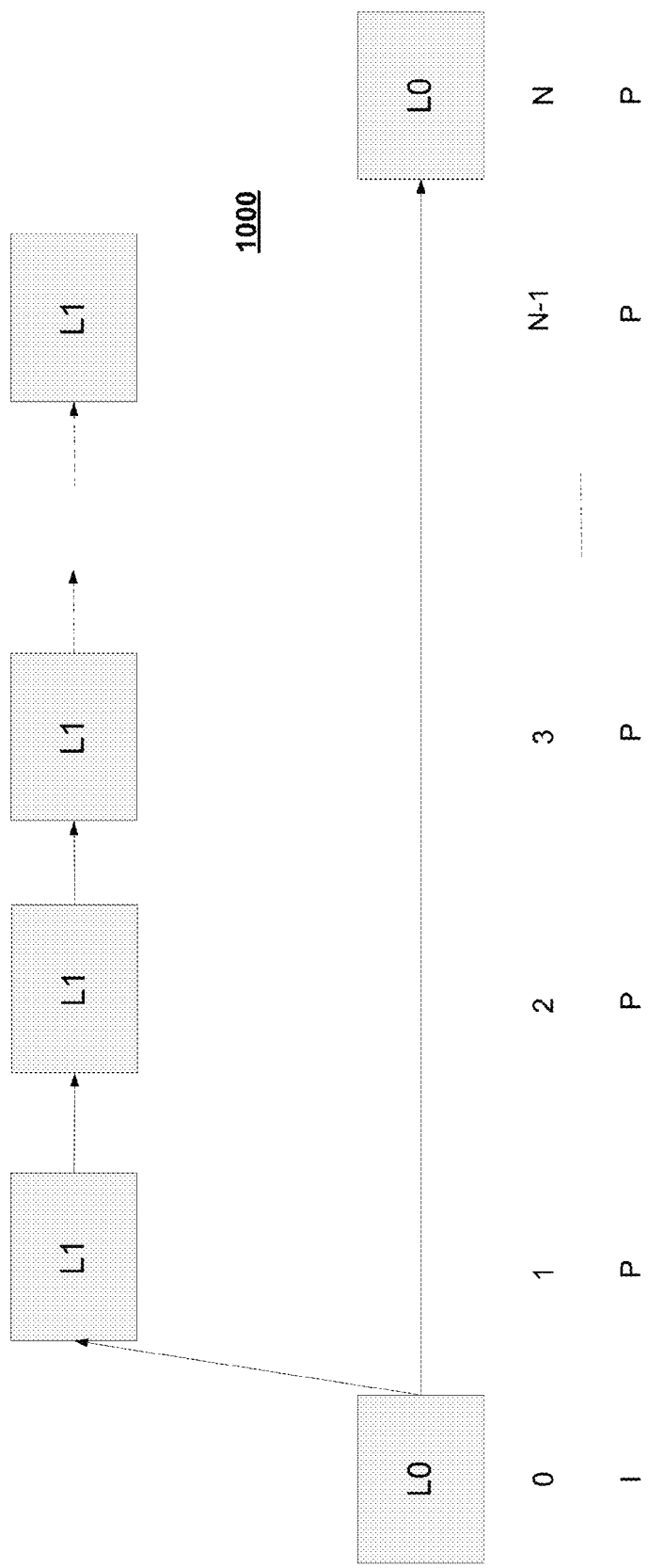
FIG. 10: ALTERNATIVE PICTURE CODING STRUCTURE EXAMPLE

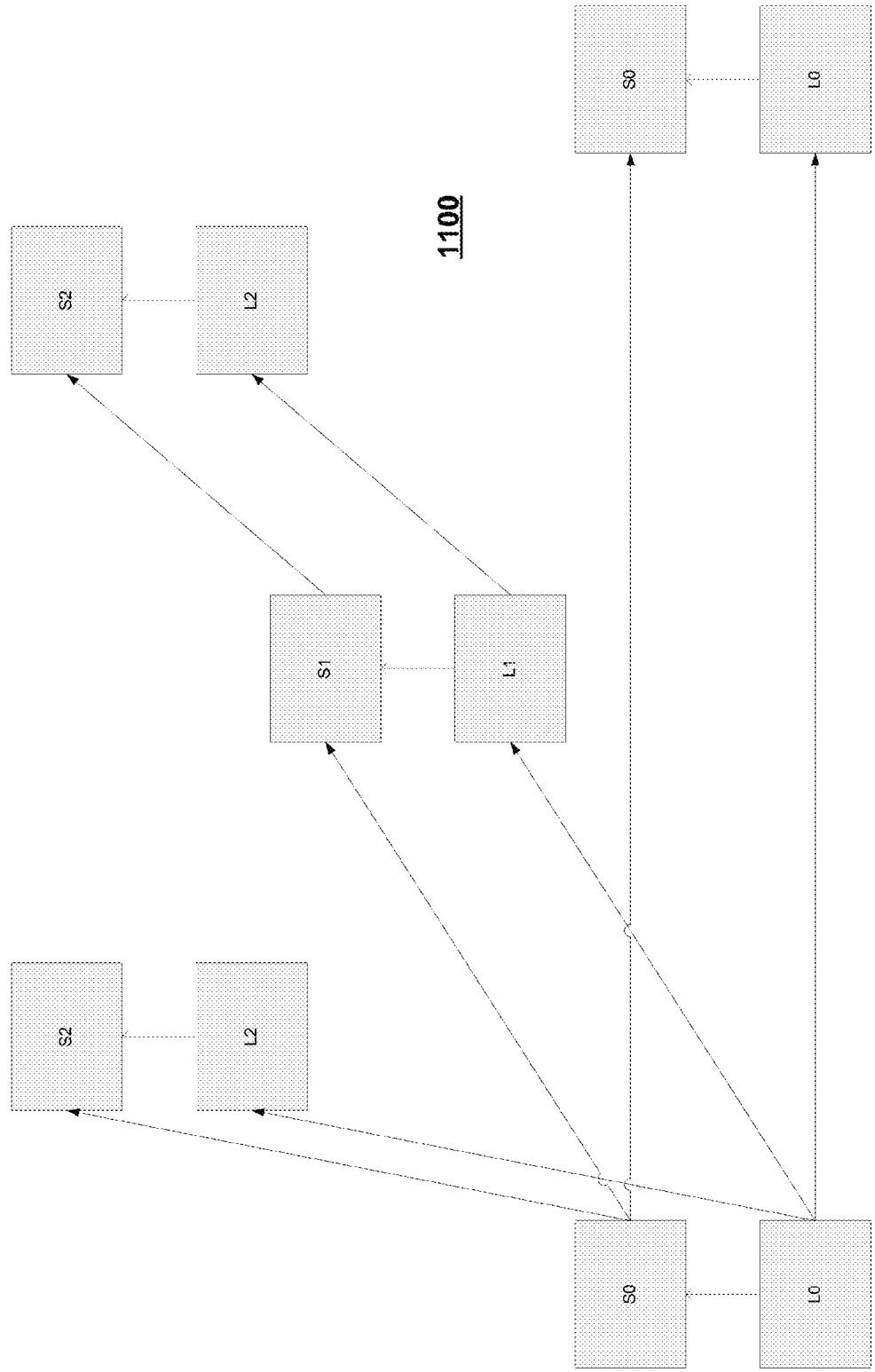
FIG. 11: PICTURE CODING STRUCTURE FOR SPATIAL SCALABILITY

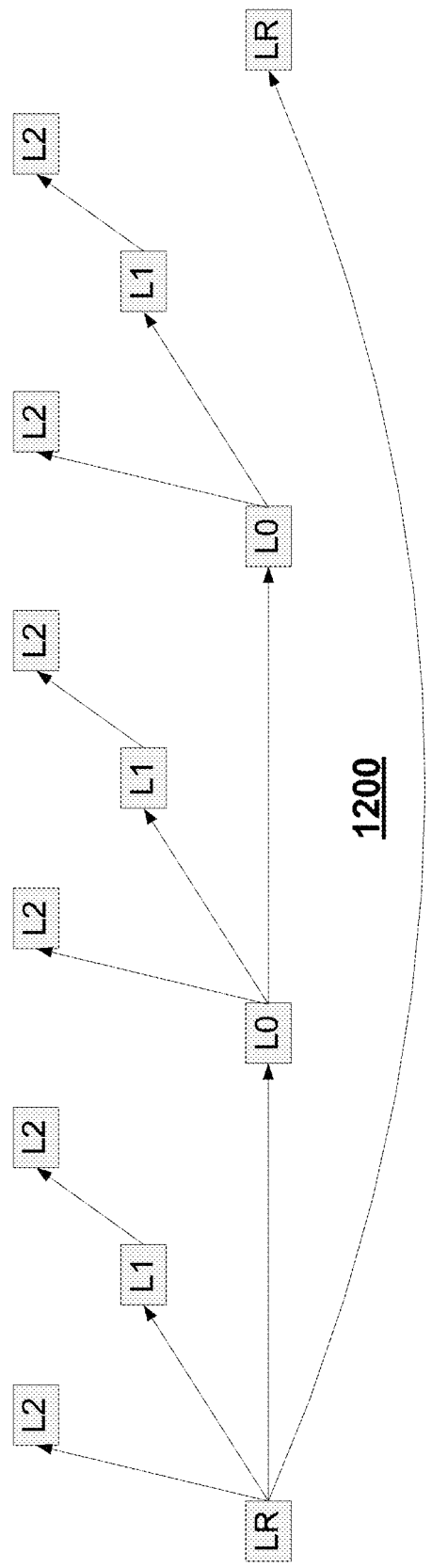
FIG. 12: PICTURE CODING STRUCTURE WITH LR PICTURES

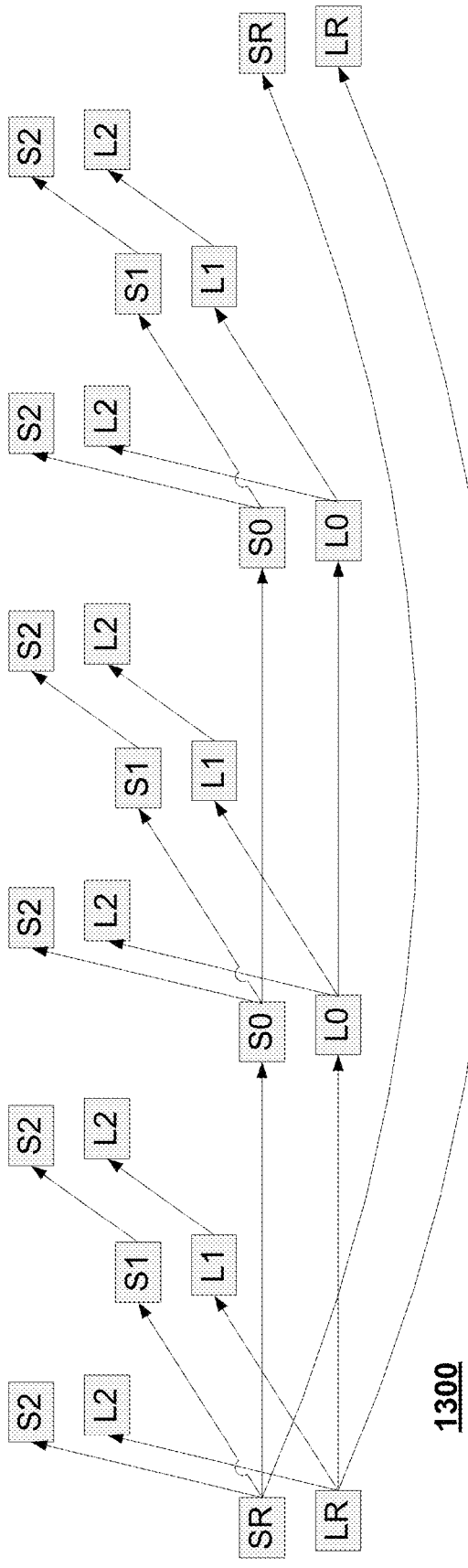
FIG. 13: PICTURE CODING STRUCTURE FOR SPATIAL SCALABILITY WITH SR PICTURES

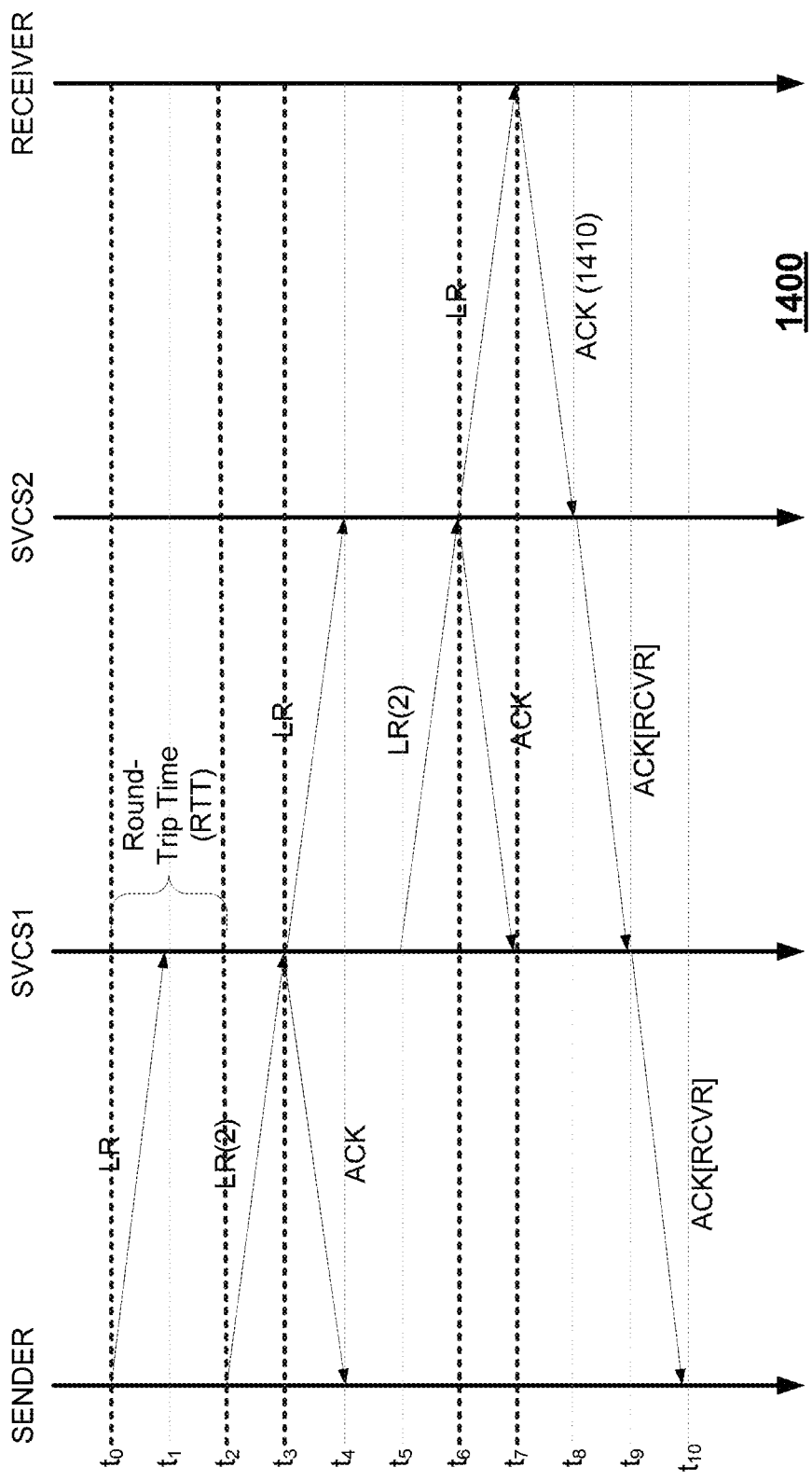
FIG. 14: THE LR PROTECTION (LRP) PROTOCOL USING POSITIVE ACKNOWLEDGMENTS

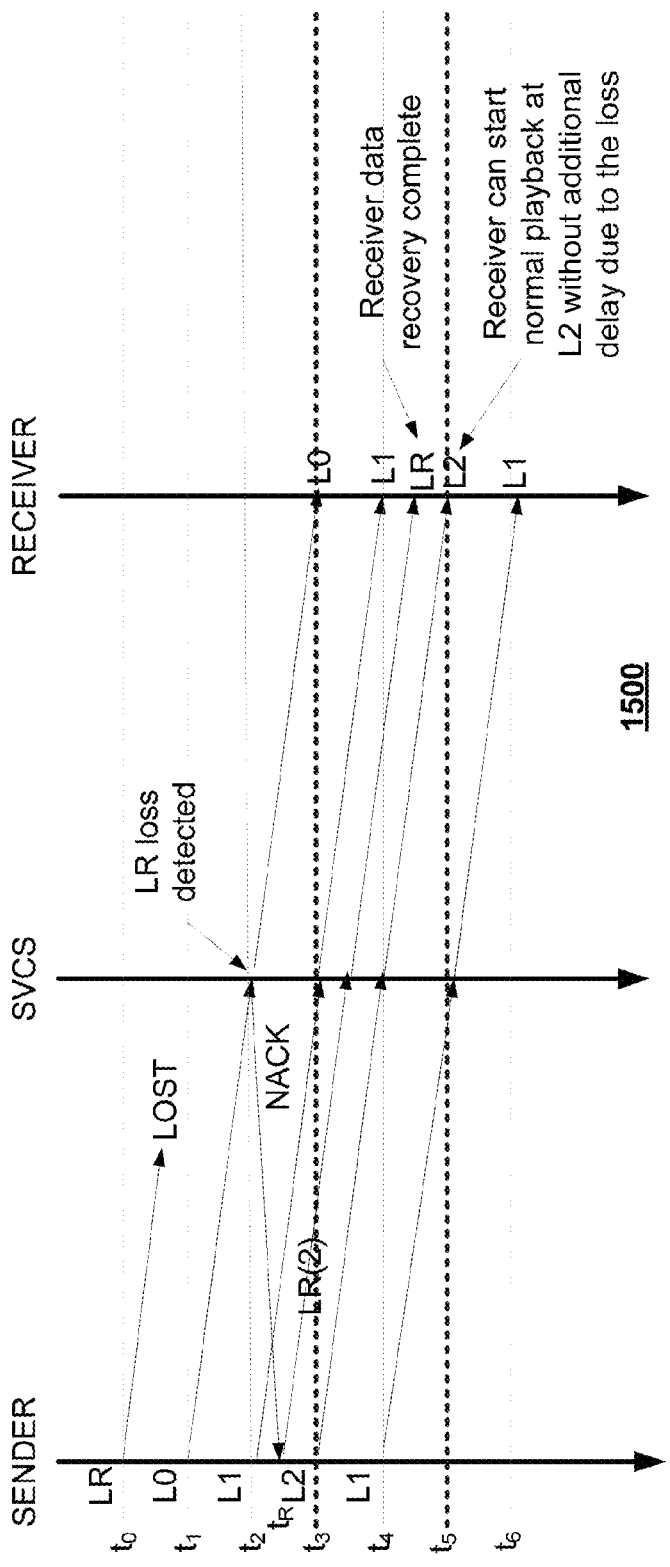
FIG. 15: THE LR PROTECTION (LRP) PROTOCOL USING NEGATIVE ACKNOWLEDGEMENTS

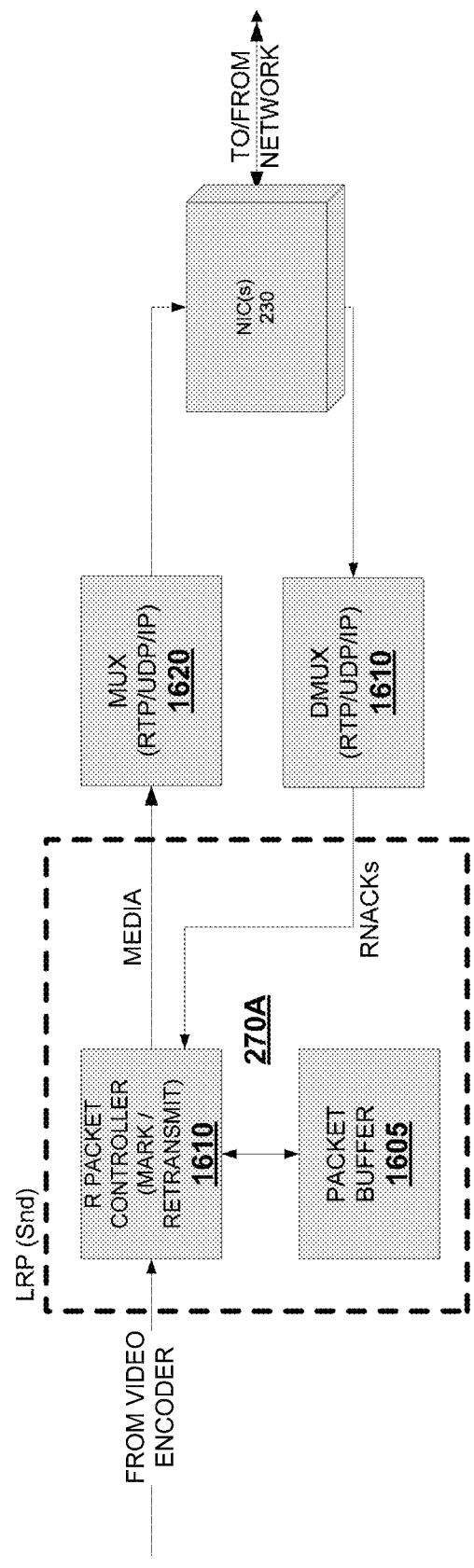
FIG. 16: TRANSMITTING TERMINAL WITH LRP USING RTP

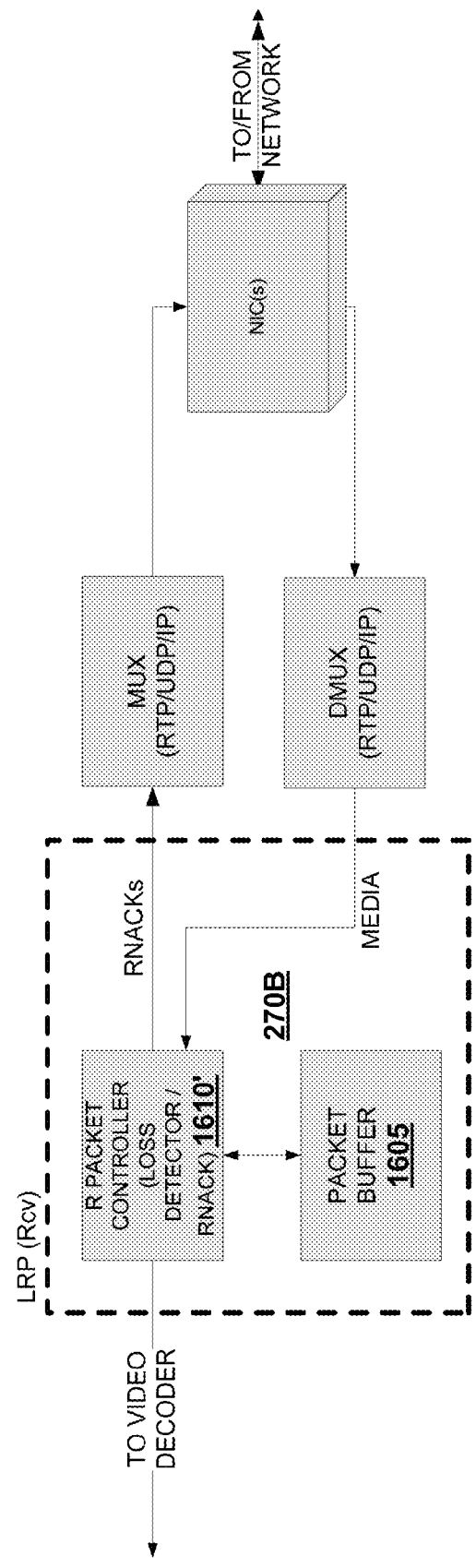
FIG. 17: RECEIVING TERMINAL WITH LRP USING RTP

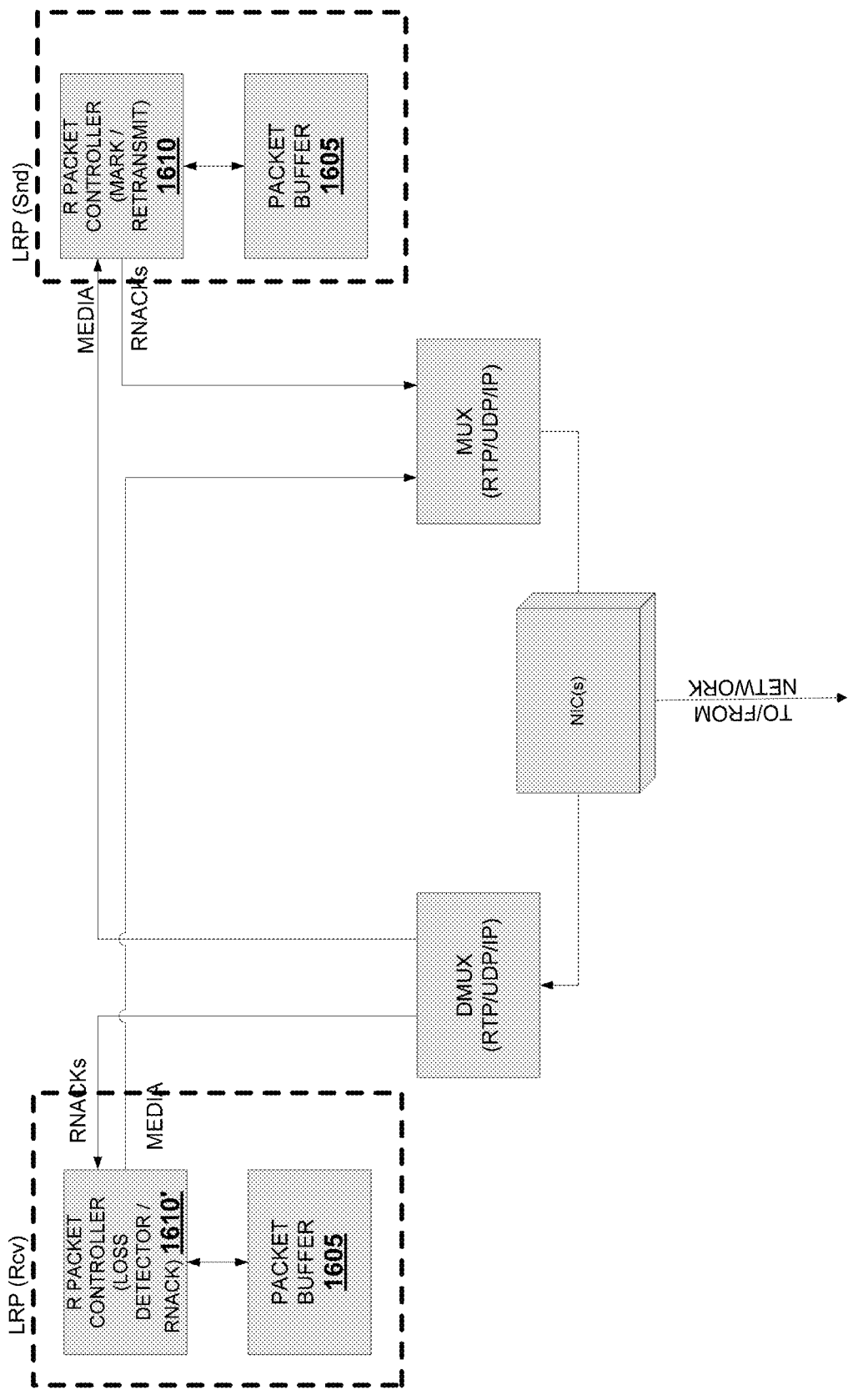
FIG. 18: SERVER WITH LRP USING RTP

FIG. 19: RTP HEADER EXTENSION FOR RTP PACKETS

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  ID   |  len  |R| MBZ | SER |          RSEQ                 |
+-+-+-+-+-+-+-+-+-+-+-+-+-+-+-+-+-+-+-+-+-+-+-+-+-+-+-+-+-+-+-+-+
|   SUPERSEDE_START [opt]       |    SUPERSEDE_END [opt]       |
+-+-+-+-+-+-+-+-+-+-+-+-+-+-+-+-+-+-+-+-+-+-+-+-+-+-+-+-+-+-+-+-+
```

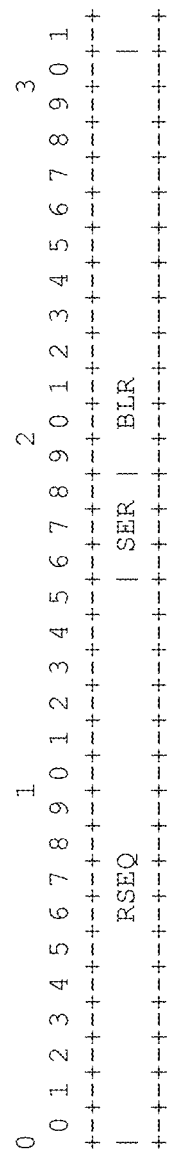
FIG. 20: RNACK FEEDBACK CONTROL INFORMATION (FCI) FIELD

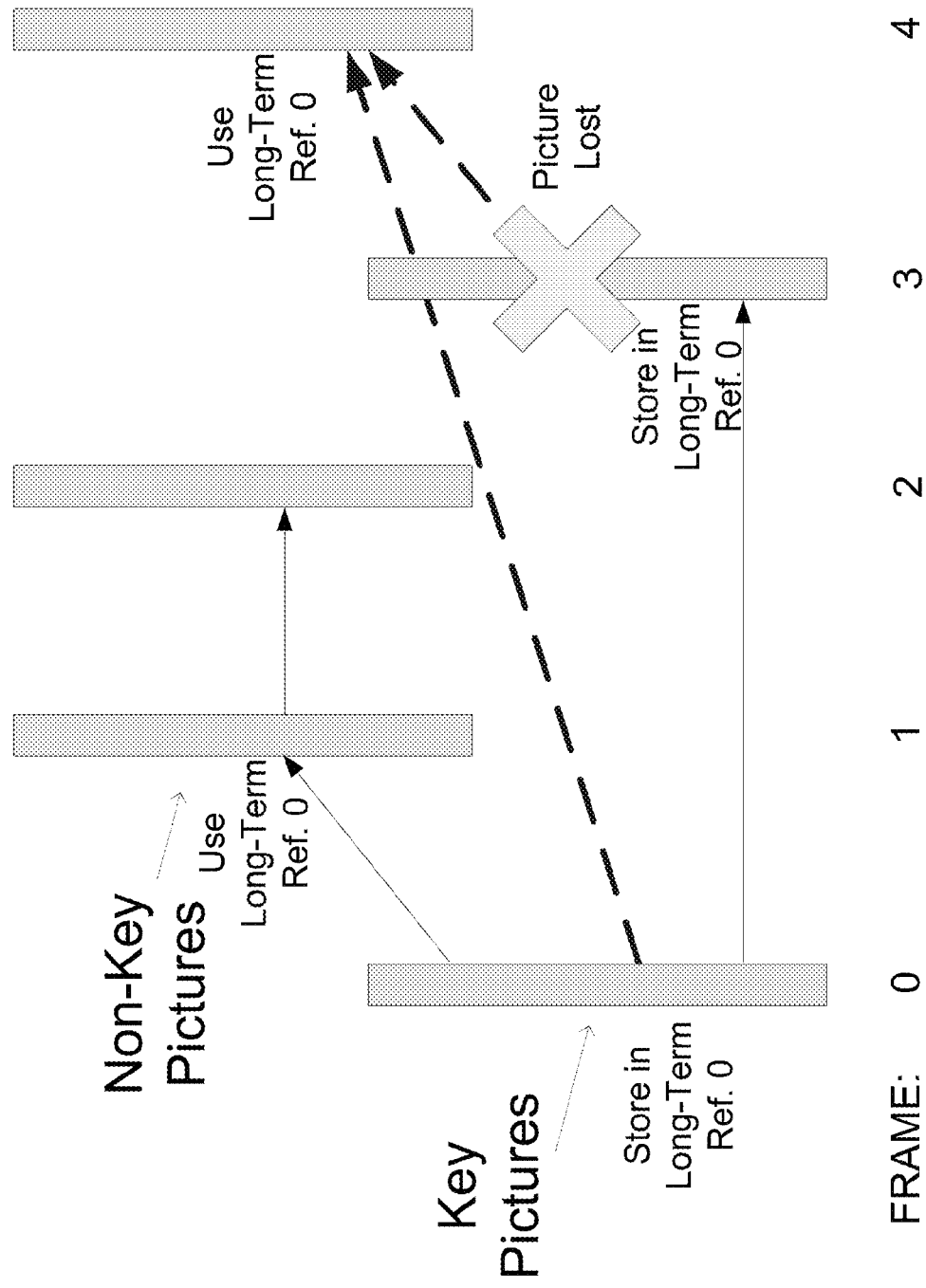
FIG. 21: EXAMPLE OF INCORRECT DECODER STATE IN H.264 SVC WHEN PACKET LOSSES OCCUR (PRIOR ART)

FIG. 22: 3-BYTE SVC NAL HEADER EXTENSION (PRIOR ART)

| Byte 0 | | | | | | | | Byte 1 | | | | | | | | Byte 2 | | | | | | | |
|---|---|---|---|---|---|---|---|---|---|---|---|---|---|---|---|---|---|---|---|---|---|---|---|
| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| R1 | | PID | | | | | DF | T | | | D | | | | Q | L | B | F | LF | FO | | | R2 |

R1: reserved_zero_bit (1)
PID: prority_id (6)
DF: discardable_flag (1)
T: temporal_level (3)
D: dependency_id (3)
Q: quality_level (2)
L: layer_base_flag (1)
B: use_base_prediction_flag (1)
F: fragmented_flag (1)
LF: last_fragment_flag (1)
FO: fragment_order (2)
R2: reserved_zero_two_bits (2)

FIG. 23: 3-BYTE SVC NAL HEADER EXTENSION WITH FRAME INDICES

| Byte 0 | | | | | | | | Byte 1 | | | | | | | | Byte 2 | | | | | | | |
|---|---|---|---|---|---|---|---|---|---|---|---|---|---|---|---|---|---|---|---|---|---|---|---|
| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| R1 | | | PID | | | | DF | T | | | D | | | Q | | L | B | F | LF | FO | | | R2 |
| | | | | | | | | 0 | | | | | | 0 | | | | | | FI | | | |
| | | | | | | | | >0 | | | | | | 0 | | | | | LFI | | | | |

Field descriptions (bit length in parenthesis)

R1:  reserved_zero_bit (1)
PID:  prority_id (6)
DF:  discardable_flag (1)
T:  temporal_level (3)
D:  dependency_id (3)
Q:  quality_level (2)
L:  layer_base_flag (1)
B:  use_base_prediction_flag (1)
F:  fragmented_flag (1)
LF:  last_fragment_flag (1)
FO:  fragment_order (2)
R2:  reserved_zero_two_bits (2)
FI:  key_picture_frame_idx (6)
LFI:  last_key_picture_frame_idx (6)

FIG. 24: SVC NAL HEADER EXTENSION WITH FRAME INDICES IN ADDITIONAL BYTE

| Byte 0 | | | | | | | |
|---|---|---|---|---|---|---|---|
| 0 | 1 | 2 | 3 | 4 | 5 | 6 | 7 |
| R1 | | PID | | | | | DF |

| Byte 1 | | | | | | | |
|---|---|---|---|---|---|---|---|
| 0 | 1 | 2 | 3 | 4 | 5 | 6 | 7 |
| | T | | | D | | Q | |
| | 0 | | | | | | |
| | >0 | | | | | | |

| Byte 2 | | | | | | | |
|---|---|---|---|---|---|---|---|
| 0 | 1 | 2 | 3 | 4 | 5 | 6 | 7 |
| L | B | F | LF | FO | | R2 | EF=0 |
| | | | | | | | 1 |
| | | | | | | | 1 |

| Byte 3 | | | | | | | |
|---|---|---|---|---|---|---|---|
| 0 | 1 | 2 | 3 | 4 | 5 | 6 | 7 |
| <not present> | | | | | | | |
| FI | | | | | | | |
| LFI | | | | | | | |

Field descriptions (bit length in parenthesis)

R1: reserved_zero_bit (1)
PID: prority_id (6)
DF: discardable_flag (1)
T: temporal_level (3)
D: dependency_id (3)
Q: quality_level (2)
L: layer_base_flag (1)
B: use_base_prediction_flag (1)
F: fragmented_flag (1)
LF: last_fragment_flag (1)
FO: fragment_order (2)
R2: reserved_zero_one_bits2 (1)
EF: extension_flag (1)
FI: key picture frame idx (8)
LFI: last key picture frame idx (8)

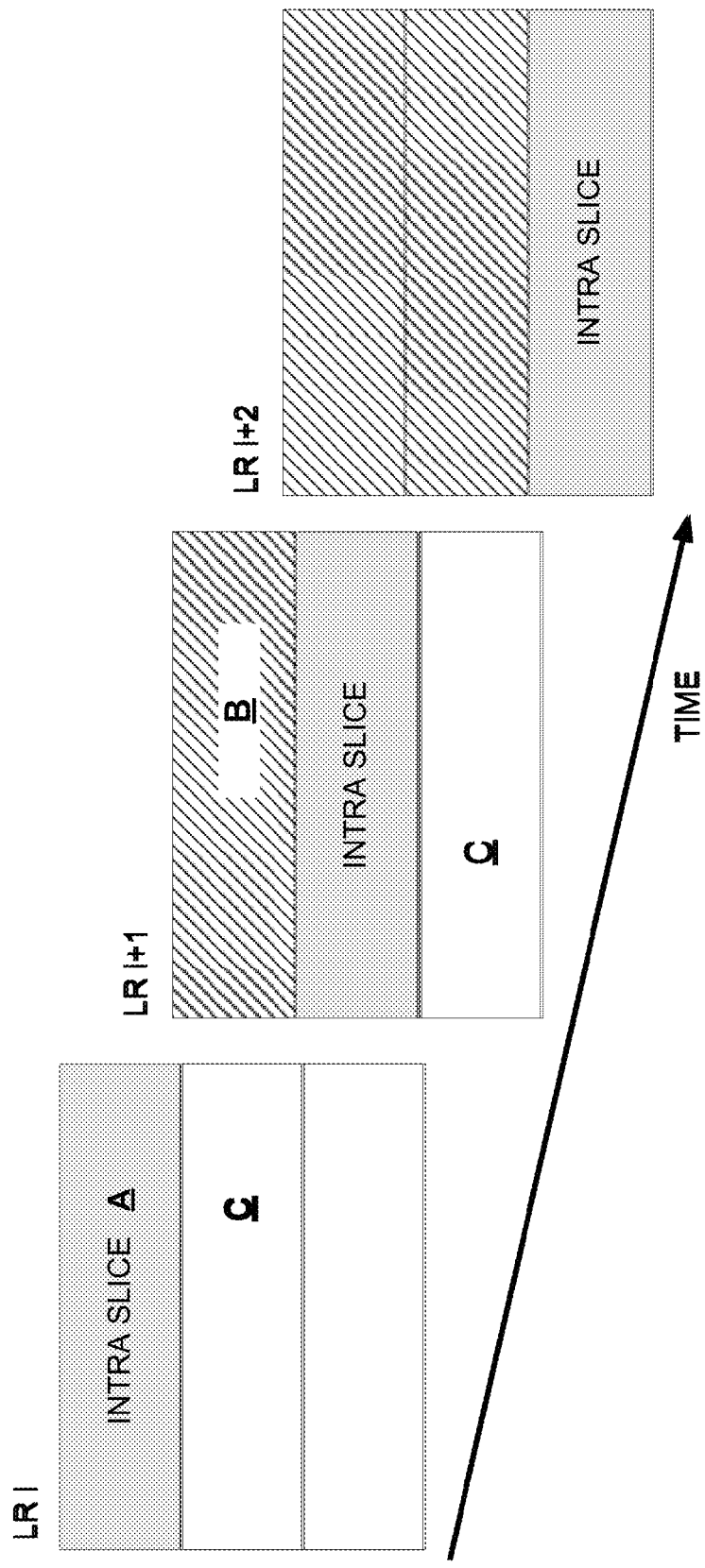
FIG. 25: FAST-FORWARD INTRA RECOVERY

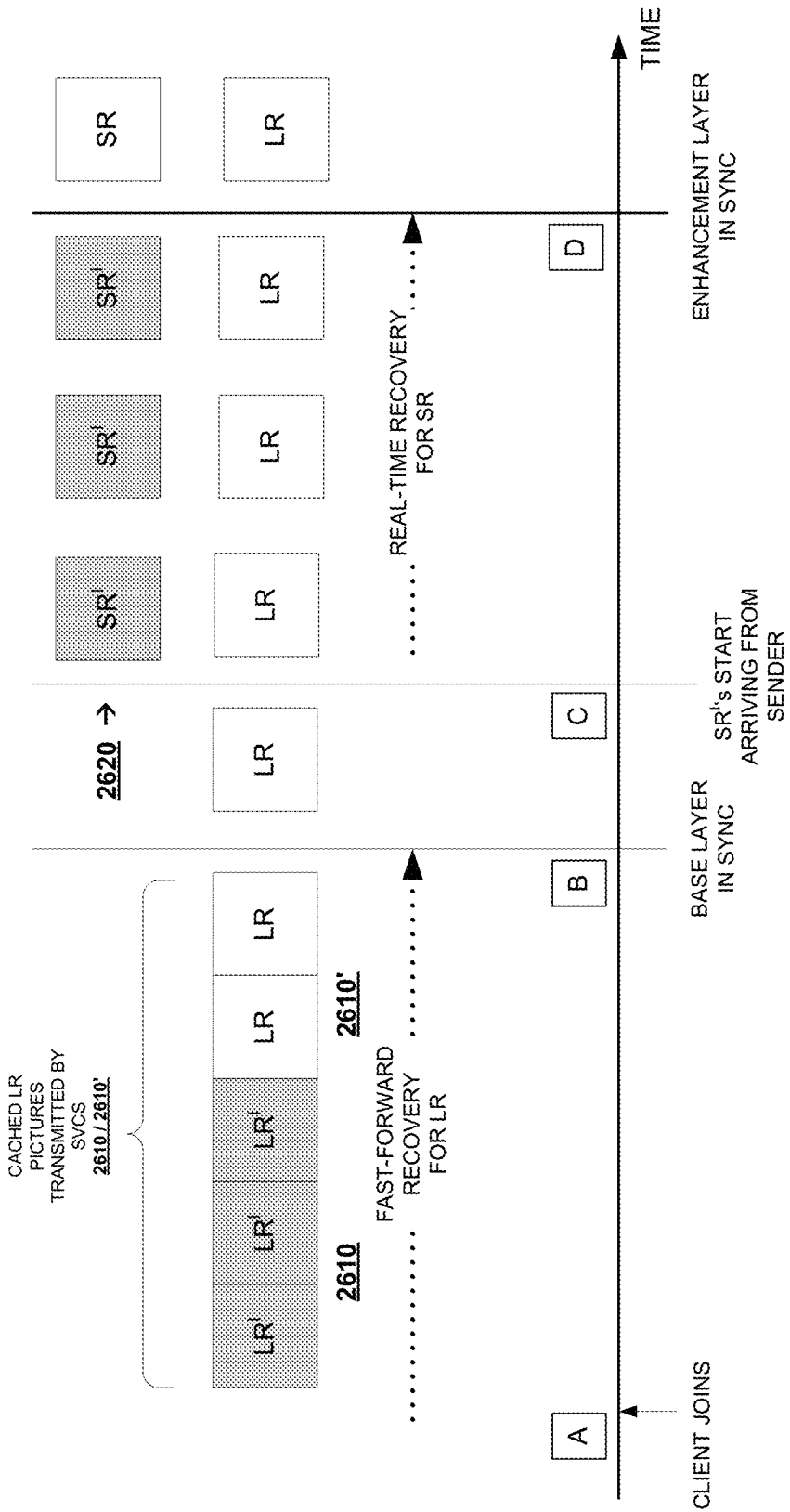

SYSTEMS AND METHODS FOR ERROR RESILIENCE AND RANDOM ACCESS IN VIDEO COMMUNICATION SYSTEMS

CROSS-REFERENCE TO RELATED APPLICATIONS

This application is a continuation of U.S. patent application Ser. No. 11/608,776 filed on Dec. 8, 2006 and claims the benefit of U.S. provisional patent applications Ser. No. 60/748,437 filed Dec. 8, 2005, Ser. No. 60/778,760 filed Mar. 3, 2006, Ser. No. 60/787,043 filed Mar. 29, 2006, Ser. No. 60/787,031 filed Mar. 29, 2006, Ser. No. 60/829,618 filed Oct. 16, 2006, Ser. Nos. 60/862,510 and 60/814,934, both filed on Oct. 23, 2006. All of the aforementioned priority applications are hereby incorporated by reference herein in their entireties.

FIELD OF THE INVENTION

The present invention relates to video data communication systems. In particular, the invention relates to techniques for providing error resilience and random access capabilities in videoconferencing applications.

BACKGROUND OF THE INVENTION

Providing high quality digital video communications between senders and receivers over packet-based modern communication networks (e.g., a network based on the Internet Protocol (IP)) is technically challenging, at least due to the fact that data transport on such networks is typically carried out on a best-effort basis. Transmission errors in modern communication networks generally manifest themselves as packet losses and not as bit errors, which were characteristic of earlier communication systems. The packet losses often are the result of congestion in intermediary routers, and not the result of physical layer errors.

When a transmission error occurs in a digital video communication system, it is important to ensure that the receiver can quickly recover from the error and return to an error-free display of the incoming video signal. However, in typical digital video communication systems, the receiver's robustness is reduced by the fact that the incoming data is heavily compressed in order to conserve bandwidth. Further, the video compression techniques employed in the communication systems (e.g., state-of-the-art codecs ITU-T H.264 and H.263 or ISO MPEG-2 and MPEG-4 codecs) can create a very strong temporal dependency between sequential video packets or frames. In particular, use of motion compensated prediction (e.g., involving the use of P or B frames) codecs creates a chain of frame dependencies in which a displayed frame depends on past frame(s). The chain of dependencies can extend all the way to the beginning of the video sequence. As a result of the chain of dependencies, the loss of a given packet can affect the decoding of a number of the subsequent packets at the receiver. Error propagation due to the loss of the given packet terminates only at an "intra" (I) refresh point, or at a frame which does not use any temporal prediction at all.

Error resilience in digital video communication systems requires having at least some level of redundancy in the transmitted signals. However, this requirement is contrary to the goals of video compression techniques, which strive to eliminate or minimize redundancy in the transmitted signals.

On a network that offers differentiated services (e.g., DiffServ IP-based networks, private networks over leased lines, etc.), a video data communication application may exploit network features to deliver some or all of video signal data in a lossless or nearly lossless manner to a receiver. However, in an arbitrary best-effort network (such as the Internet) that has no provision for differentiated services, a data communication application has to rely on its own features for achieving error resilience. Known techniques (e.g., the Transmission Control Protocol—TCP) that are useful in text or alpha-numeric data communications are not appropriate for video or audio communications, which have the added constraint of low end-to-end delay arising out of human interface requirements. For example, TCP techniques may be used for error resilience in text or alpha-numeric data transport. TCP keeps on retransmitting data until confirmation that all data is received, even if it involves a delay is several seconds. However, TCP is inappropriate for video data transport in a live or interactive videoconferencing application because the end-to-end delay, which is unbounded, would be unacceptable to participants.

A related problem is that of random access. Assume that a receiver joins an existing transmission of a video signal. Typical examples are a user who joins a videoconference, or a user who tunes in to a broadcast. Such a user would have to find a point in the incoming bitstream where he/she can start decoding and be in synchronization with the encoder. Providing such random access points, however, has a considerable impact on compression efficiency. Note that a random access point is, by definition, an error resilience feature since at that point any error propagation terminates (i.e., it is an error recovery point). Hence the better the random access support provided by a particular coding scheme, the faster error recovery it can provide. The converse may not always be true; it depends on the assumptions made about the duration and extent of the errors that the error resilience technique has been designed to address. For error resilience, some state information could be assumed to be available at the receiver at the time the error occurred.

An aspect of error resilience in video communication systems relates to random access (e.g., when a receiver joins an existing transmission of a video signal), which has a considerable impact on compression efficiency. Instances of random access are, for example, a user who joins a videoconference, or a user who tunes in to a broadcast. Such a user would have to find a suitable point in the incoming bitstream signal to start decoding and be synchronized with the encoder. A random access point is effectively an error resilience feature since at that point any error propagation terminates (or is an error recovery point). Thus, a particular coding scheme, which provides good random access support, will generally have an error resilience technique that provides for faster error recovery. However, the converse depends on the specific assumptions about the duration and extent of the errors that the error resilience technique is designed to address. The error resilience technique may assume that some state information is available at the receiver at the time an error occurs. In such case, the error resilience technique does not assure good random access support.

In MPEG-2 video codecs for digital television systems (digital cable TV or satellite TV), I pictures are used at periodic intervals (typically 0.5 sec) to enable fast switching into a stream. The I pictures, however, are considerably larger than their P or B counterparts (typically by 3-6 times) and are thus to be avoided, especially in low bandwidth and/or low delay applications.

In interactive applications such as videoconferencing, the concept of requesting an intra update is often used for error resilience. In operation, the update involves a request from the receiver to the sender for an intra picture transmission, which enables the decoder to be synchronized. The bandwidth overhead of this operation is significant. Additionally, this overhead is also incurred when packet errors occur. If the packet losses are caused by congestion, then the use of the intra pictures only exacerbates the congestion problem.

Another traditional technique for error robustness, which has been used in the past to mitigate drift caused by mismatch in IDCT implementations (e.g., in the H.261 standard), is to periodically code each macroblock intra mode. The H.261 standard requires forced intra coding every 132 times a macroblock is transmitted.

The coding efficiency decreases with increasing percentage of macroblocks that are forced to be coded as intra in a given frame. Conversely, when this percentage is low, the time to recover from a packet loss increases. The forced intra coding process requires extra care to avoid motion-related drift, which further limits the encoder's performance since some motion vector values have to be avoided, even if they are the most effective.

In addition to traditional, single-layer codecs, layered or scalable coding is a well-known technique in multimedia data encoding. Scalable coding is used to generate two or more "scaled" bitstreams collectively representing a given medium in a bandwidth-efficient manner. Scalability can be provided in a number of different dimensions, namely temporally, spatially, and quality (also referred to as SNR "Signal-to-Noise Ratio" scalability). For example, a video signal may be scalably coded in different layers at CIF and QCIF resolutions, and at frame rates of 7.5, 15, and 30 frames per second (fps). Depending on the codec's structure, any combination of spatial resolutions and frame rates may be obtainable from the codec bitstream. The bits corresponding to the different layers can be transmitted as separate bitstreams (i.e., one stream per layer) or they can be multiplexed together in one or more bitstreams. For convenience in description herein, the coded bits corresponding to a given layer may be referred to as that layer's bitstream, even if the various layers are multiplexed and transmitted in a single bitstream. Codecs specifically designed to offer scalability features include, for example, MPEG-2 (ISO/IEC 13818-2, also known as ITU-T H.262) and the currently developed SVC (known as ITU-T H.264 Annex G or MPEG-4 Part 10 SVC). Scalable coding techniques specifically designed for video communication are described in commonly assigned international patent application No. PCT/US06/028365, "SYSTEM AND METHOD FOR SCALABLE AND LOW-DELAY VIDEOCONFERENCING USING SCALABLE VIDEO CODING". It is noted that even codecs that are not specifically designed to be scalable can exhibit scalability characteristics in the temporal dimension. For example, consider an MPEG-2 Main Profile codec, a non-scalable codec, which is used in DVDs and digital TV environments. Further, assume that the codec is operated at 30 fps and that a GOP structure of IBBPBBPBBPBBPBB (period N=15 frames) is used. By sequential elimination of the B pictures, followed by elimination of the P pictures, it is possible to derive a total of three temporal resolutions: 30 fps (all picture types included), 10 fps (I and P only), and 2 fps (I only). The sequential elimination process results in a decodable bitstream because the MPEG-2 Main Profile codec is designed so that coding of the P pictures does not rely on the B pictures, and similarly coding of the I pictures does not rely on other P or B pictures. In the following, single-layer codecs with temporal scalability features are considered to be a special case of scalable video coding, and are thus included in the term scalable video coding, unless explicitly indicated otherwise.

Scalable codecs typically have a pyramidal bitstream structure in which one of the constituent bitstreams (called the "base layer") is essential in recovering the original medium at some basic quality. Use of one or more the remaining bitstream(s) (called "the enhancement layer(s)") along with the base layer increases the quality of the recovered medium. Data losses in the enhancement layers may be tolerable, but data losses in the base layer can cause significant distortions or complete loss of the recovered medium.

Scalable codecs pose challenges similar to those posed by single layer codecs for error resilience and random access. However, the coding structures of the scalable codecs have unique characteristics that are not present in single layer video codecs. Further, unlike single layer coding, scalable coding may involve switching from one scalability layer to another (e.g., switching back and forth between CIF and QCIF resolutions).

Simulcasting is a coding solution for videoconferencing that is less complex than scalable video coding but has some of the advantages of the latter. In simulcasting, two different versions of the source are encoded (e.g., at two different spatial resolutions) and transmitted. Each version is independent, in that its decoding does not depend on reception of the other version. Like scalable and single-layer coding, simulcasting poses similar random access and robustness issues. In the following, simulcasting is considered a special case of scalable coding (where no inter layer prediction is performed) and both are referred to simply as scalable video coding techniques unless explicitly indicated otherwise.

Consideration is now being given to improving error resilience and capabilities for random access to the coded bitstreams in video communications systems. Attention is directed developing error resilience and random access techniques, which have a minimal impact on end-to-end delay and the bandwidth used by the system. Desirable error resilience and random access techniques will be applicable to both scalable and single-layer video coding.

SUMMARY OF THE INVENTION

The present invention provides systems and methods to increase error resilience, and to provide random access capabilities in video communication systems based on single-layer as well as scalable video coding.

In a first exemplary embodiment, the present invention provides a mechanism to reliably transmit all or portions of the lowest or single temporal layer of a coded video signal without increasing the end-to-end delay, and then to use it to recover from packet losses. Specific techniques are provided for transmission over RTP as well as when using H.264 Annex G (SVC) NAL units.

In a second exemplary embodiment the present invention provides a mechanism to reliably transmit the lowest or single temporal layer of a coded video signal using server-based intra frames, and then use it to recover a particular receiver from packet losses without adversely impacting other receivers.

In a third exemplary embodiment, the present invention provides a mechanism in which by using intra macroblock coding in a carefully orchestrated way it is possible to recover from packet losses in single-layer and scalable video coding.

In a fourth exemplary embodiment, the present invention provides a mechanism to collect and aggregate feedback from one ore more recipients in order to optimally select picture reference frames as well as allocation of intra macroblocks.

In a fifth exemplary embodiment, the present invention provides a mechanism to recover from lost packets of a high resolution spatially scalable layer by using information from the low resolution spatial layer.

Further, in a sixth exemplary embodiment, the present invention provides a mechanism for switching from a low spatial or quality resolution to a high spatial or quality resolution with little or no delay.

Coupled with rate-distortion optimized quantizer and motion mode and vector selection, these embodiments, either alone or in combinations, allow the construction of extremely efficient video communication systems with high robustness and small bandwidth overhead.

The description herein explains how to use these techniques to implement random access to a given video stream, as well as the mechanisms with which the receiver can effectively reconstruct high spatial resolution data for the higher layers using information from the lower layers that does not require full decoding of said lower layers. The present invention capitalizes on the special properties of scalable video coding techniques to minimize the impact to the end-to-end delay and bandwidth. The present invention is particularly useful in communication applications such as videoconferencing over IP networks, where the end-to-end requirements are stringent (maximum 200 msec end-to-end) and packet loss rates can be severe (i.e., low average packet loss rates but in long bursts).

The techniques of the present invention, upon appropriate selection of picture coding structures and transport modes, make it is possible to allow nearly instantaneous layer switching with very little bandwidth overhead.

BRIEF DESCRIPTION OF THE DRAWINGS

FIG. 1 is a block diagram illustrating an exemplary video conferencing system for delivering scalably coded video data, in accordance with the principles of the present invention;

FIG. 2 is a block diagram illustrating an exemplary end-user terminal compatible with the use of single layer video coding, in accordance with the principles of the present invention;

FIG. 3 is a block diagram illustrating an exemplary end-user terminal compatible with the use of scalable or simulcast coding, in accordance with the principles of the present invention;

FIG. 4 is a block diagram illustrating the internal switching structure of a multipoint SVCS, in accordance with the principles of the present invention;

FIG. 5 is a block diagram illustrating the principles of operation of an SVCS;

FIG. 6 is a block diagram illustrating the structure of an exemplary video encoder, in accordance with the principles of the present invention;

FIG. 7 is a block diagram illustrating an exemplary architecture of a video encoder for encoding base and temporal enhancement layers, in accordance with the principles of the present invention;

FIG. 8 is a block diagram illustrating an exemplary architecture of a video encoder for a spatial enhancement layer, in accordance with the principles of the present invention;

FIG. 9 is a block diagram illustrating an exemplary layered picture coding structure, in accordance with the principles of the present invention;

FIG. 10 is a block diagram illustrating another exemplary layered picture coding structure, in accordance with the principles of the present invention;

FIG. 11 is a block diagram illustrating an exemplary picture coding structure including temporal and spatial scalability, in accordance with the principles of the present invention;

FIG. 12 is a block diagram illustrating an exemplary layered picture coding structure used for error resilient video communications, in accordance with the principles of the present invention;

FIG. 13 is a block diagram illustrating an exemplary picture coding structure used for error resilient video communications with spatial/quality scalability, in accordance with the principles of the present invention.

FIG. 14 is a time diagram illustrating the operation of a communication protocol for the reliable delivery of LR pictures using positive acknowledgments, in accordance with the principles of the present invention.

FIG. 15 is a time diagram illustrating the operation of a communication protocol for the reliable delivery of LR pictures using negative acknowledgments, in accordance with the principles of the present invention.

FIG. 16 is a block diagram illustrating an exemplary architecture of the transmitting terminal's LRP Snd module when the R-packets technique is used for transmission over RTP, in accordance with the principles of the present invention.

FIG. 17 is a block diagram illustrating an exemplary architecture of the receiving terminal's LRP Rcv module when the R-packets technique is used for transmission over RTP, in accordance with the principles of the present invention.

FIG. 18 is a block diagram illustrating an exemplary architecture of the server's LRP Snd and Rcv modules when the R-packets technique is used for transmission over RTP, in accordance with the principles of the present invention.

FIG. 19 illustrates an exemplary structure for the named RTP header extension for RTP packets, in accordance with the principles of the present invention.

FIG. 20 illustrates an exemplary structure for the feedback control information field of RNACK packets, in accordance with the principles of the present invention.

FIG. 21 illustrates how an H.264 SVC decoder can reach an incorrect state when packet losses occur in prior art systems.

FIG. 22 illustrates the currently defined H.264 SVC NAL header extension for prior art systems.

FIG. 23 illustrates a modified H.264 SVC NAL header extension definition with frame indices, in accordance with the principles of the present invention.

FIG. 24 illustrates a modified H.264 SVC NAL header extension definition with frame indices placed in an extension of the header, in accordance with the principles of the present invention.

FIG. 25 illustrates an exemplary slice coding structure for fast-forward intra recovery, in accordance with the principles of the present invention.

FIG. 26 illustrates how fast-forward intra recovery can be used in conjunction with SR (enhancement layer) pictures, in accordance with the principles of the present invention.

Throughout the figures the same reference numerals and characters, unless otherwise stated, are used to denote like features, elements, components or portions of the illustrated embodiments. Moreover, while the present invention will now be described in detail with reference to the Figures, it is done so in connection with the illustrative embodiments.

DETAILED DESCRIPTION OF THE INVENTION

The present invention provides systems and methods for error resilient transmission and for random access in video communication systems. The mechanisms are compatible with scalable video coding techniques as well as single-layer and simulcast video coding with temporal scalability, which may be used in video communication systems.

The system and methods involve designating a set of video frames or pictures in a video signal transmission for reliable or guaranteed delivery to receivers. Reliable delivery of the designated set video frames may be accomplished by using secure or high reliability links, or by retransmission techniques. The reliably-delivered video frames are used as reference pictures for resynchronization of receivers with the transmitted video signal after error incidence or for random access.

In a preferred embodiment, an exemplary video communication system may be a multi-point videoconferencing system 10 operated over a packet-based network. (See e.g., FIG. 1). Multi-point videoconferencing system may include optional bridges 120*a* and 120*b* (e.g., Multipoint Control Unit (MCU) or Scalable Video Communication Server (SVCS)) to mediate scalable multilayer or single layer video communications between endpoints (e.g., users 1-*k* and 1-*m*) over the network. The operation of the exemplary video communication system is the same and as advantageous for a point-to-point connection with or without the use of optional bridges 120*a* and 120*b*.

A detailed description of scalable video coding techniques and videoconferencing systems based on scalable video coding is provided in commonly assigned International patent application No. PCT/US06/28365 "SYSTEM AND METHOD FOR SCALABLE AND LOW-DELAY VIDEO-CONFERENCING USING SCALABLE VIDEO CODING" and No. PCT/US06/28366 "SYSTEM AND METHOD FOR A CONFERENCE SERVER ARCHITECTURE FOR LOW DELAY AND DISTRIBUTED CONFERENCING APPLICATIONS." Further, descriptions of scalable video coding techniques and videoconferencing systems based on scalable video coding are provided in U.S. provisional patent application No. 60/753,343 "COMPOSITING SCALABLE VIDEO CONFERENCE SERVER," filed Dec. 22, 2005. All of the aforementioned International and United States provisional patent applications are incorporated by reference herein in their entireties.

FIG. 1 shows the general structure of a videoconferencing system 10. Videoconferencing system 10 includes a plurality of end-user terminals (e.g., users 1-*k* and users 1-*m*) that are linked over a network 100 via LANS 1 and 2 and servers 120*a* and 120*b*. The servers may be traditional MCUs, or Scalable Video Coding servers (SVCS) or Compositing Scalable Video Coding servers (CSVCS). The latter servers have the same purpose as traditional MCUs, but with significantly reduced complexity and improved functionality. (See e.g., International patent application No. PCT/US06/28366), and U.S. provisional patent application No. 60/753,343, Dec. 22, 2005). In the description herein, the term "server" may be used generically to refer to either an SVCS or an CSVCS.

FIG. 2 shows the architecture of an end-user terminal 140, which is designed for use with videoconferencing systems (e.g., system 100) based on single layer coding. Similarly, FIG. 3 shows the architecture of an end-user terminal 140, which is designed for use with videoconferencing systems (e.g., system 10) based on multi layer coding. Terminal 140 includes human interface input/output devices (e.g., a camera 210A, a microphone 210B, a video display 250C, a speaker 250D), and one or more network interface controller cards (NICs) 230 coupled to input and output signal multiplexer and demultiplexer units (e.g., packet MUX 220A and packet DMUX 220B). NIC 230 may be a standard hardware component, such as an Ethernet LAN adapter, or any other suitable network interface device, or a combination thereof.

Camera 210A and microphone 210B are designed to capture participant video and audio signals, respectively, for transmission to other conferencing participants. Conversely, video display 250C and speaker 250D are designed to display and play back video and audio signals received from other participants, respectively. Video display 250C may also be configured to optionally display participant/terminal 140's own video. Camera 210A and microphone 210B outputs are coupled to video and audio encoders 210G and 210H via analog-to-digital converters 210E and 210F, respectively. Video and audio encoders 210G and 210H are designed to compress input video and audio digital signals in order to reduce the bandwidths necessary for transmission of the signals over the electronic communications network. The input video signal may be live, or pre-recorded and stored video signals. The encoders compress the local digital signals in order to minimize the bandwidth necessary for transmission of the signals.

In an exemplary embodiment of the present invention, the audio signal may be encoded using any suitable technique known in the art (e.g., G.711, G.729, G.729EV, MPEG-1, etc.). In a preferred embodiment of the present invention, the scalable audio codec G.729EV is employed by audio encoder 210G to encode audio signals. The output of audio encoder 210G is sent to multiplexer MUX 220A for transmission over network 100 via NIC 230.

Packet MUX 220A may perform traditional multiplexing using the RTP protocol. Packet MUX 220A may also perform any related Quality of Service (QoS) processing that may be offered by network 100. Each stream of data from terminal 140 is transmitted in its own virtual channel or "port number" in IP terminology.

FIG. 3 shows the end-user terminal 140, which is configured for use with videoconferencing systems in which scalable or simulcast video coding is used. In this case, video encoder 210G has multiple outputs. FIG. 3 shows, for example, two layer outputs, which are labeled as "base" and "enhancement". The outputs of terminal 140 (i.e., the single layer output (FIG. 2) or the multiple layer outputs (FIG. 3)) are connected to Packet MUX 220A via an LRP processing module 270A. LRP processing modules 270A (and modules 270B) are designed for error resilient communications ("error resilience LRP operation") by processing transmissions of special types of frames (e.g. "R" frames, FIGS. 12 and 13) as well as any other information that requires reliable transmission such as video sequence header data. If video encoder 210G produces more than one enhancement layer output, then each may be connected to LRP processing module 270A in the same manner as shown in FIG. 3. Similarly, in this case, the additional enhancement layers will be provided to video decoders 230A via LRP processing modules 270B. Alternatively, one or more of the enhancement layer outputs may be directly connected to Packet MUX 220A, and not via LRP processing module 270A.

Terminal 140 also may be configured with a set of video and audio decoder pairs 230A and 230B, with one pair for each participant that is seen or heard at terminal 140 in a videoconference. It will be understood that although several instances of decoders 230A and 230B are shown in FIGS. 2 and 3, it is possible to use a single pair of decoders 230A and 230B to sequentially process signals from multiple participants. Thus, terminal 140 may be configured with a single pair or a fewer number of pairs of decoders 230A and 230B than the number of participants.

The outputs of audio decoders 230B are connected to an audio mixer 240, which in turn is connected with a digital-to-analog converter (DA/C) 250A, which drives speaker 250B. The audio mixer combines the individual signals into a single output signal for playback. If the audio signals arrive pre-mixed, then audio mixer 240 may not be required. Similarly, the outputs of video decoders 230A may be combined in the frame buffer 250B of video display 250C via compositor 260. Compositor 260 is designed to position each decoded picture at an appropriate area of the output picture display. For example, if the display is split into four smaller areas, then compositor 260 obtains pixel data from each of video decoders 230A and places it in the appropriate frame buffer position (e.g., by filling up the lower right picture). To avoid double buffering (e.g., once at the output of decoder 230A and once at frame buffer 250B), compositor 260 may be implemented as an address generator that drives the placement of the output pixels of decoder 230A. Other techniques for optimizing the placement of the individual video outputs to display 250C can also be used to similar effect.

For example, in the H.264 standard specification, it is possible to combine views of multiple participants in a single coded picture by using a flexible macroblock ordering (FMO) scheme. In this scheme, each participant occupies a portion of the coded image, comprising one of its slices. Conceptually, a single decoder can be used to decode all participant signals. However, from a practical view, the receiver/terminal will have to decode four smaller independently coded slices. Thus, terminal 140 shown in FIGS. 2 and 3 with decoders 230A may be used in applications of the H.264 specification. It is noted that the server for forwarding slices is an CSVCS.

In terminal 140, demultiplexer DMUX 220B receives packets from NIC 320 and redirects them to the appropriate decoder unit 230A via receiving LRP modules 270B as shown in FIGS. 2 and 3. LRP modules 270B at the inputs of video decoders 230A terminate the error resilience LRP operation (FIGS. 12 and 13) at the receiving terminal end.

The MCU or SERVER CONTROL block 280 coordinates the interaction between the server (SVCS/CSVCS) and the end-user terminals. In a point-to-point communication system without intermediate servers, the SERVER CONTROL block is not needed. Similarly, in non-conferencing applications, only a single decoder is needed at a receiving end-user terminal. For applications involving stored video (e.g., broadcast of pre-recorded, pre-coded material), the transmitting end-user terminal may not involve the entire functionality of the audio and video encoding blocks or of all the terminal blocks preceding them (e.g., camera, microphone, etc.). Specifically, only the portions related to selective transmission of video packets, as explained below, need to be provided.

It will be understood that the various components of terminal 140 may be physically separate software and hardware devices or units that are interconnected to each other (e.g., integrated in a personal computer), or may be any combination thereof.

FIG. 4 shows the structure of an exemplary SVCS 400 for use in error resilient processing applications. The core of the SVCS 400 is a switch 410 that determines which packet from each of the possible sources is transmitted to which destination and over what channel. (See e.g., PCT/US06/028366).

The principles of operation of an exemplary SVCS 400 can be understood with reference to FIG. 5. A SVC Encoder 510 at a transmitting terminal or endpoint in this example produces three spatial layers in addition to a number of temporal layers (not shown pictorially). The individual coded video layers are transmitted from the transmitting endpoint (SVC Encoder) to SVCS 400 in individual packets. SVCS 400 decides which packets to forward to each of the three recipient/decoders 520 shown, depending on network conditions or user preferences. In the example shown in FIG. 5 SVCS 400 forwards only the first and second spatial layers to SVC Decoder 520(0), all three spatial layers to SVC Decoder 520(1), and only the first (base) layer to SVC Decoder 520(2).

With renewed reference to FIG. 4, in addition to the switch, which is described in PCT/US06/028366, SVCS 400 includes LRP units 470A and 470B, which are disposed at the switch inputs and outputs, respectively. SVCS 400 is configured to terminate error resilience LRP processing at its incoming switch connection, and to initiate error resilience LRP processing at its outgoing switch connections. In implementations of the invention using SVCS 400, error resilience LRP processing is not performed end-to-end over the network, but only over each individual connection segment (e.g., sender-to-SVCS, SVCS-to-SVCS, and SVCS-to-recipient). It will, however, be understood that the inventive error resilience LRP processing may be executed in an end-to-end fashion over the network, with or without the use an SVCS. An SVCS 400 without LRP units 470A and 470B can be used for end-to-end LRP processing in networks in which an SVCS is used. Further, SVCS 400 may be equipped with more than one NIC 230, as would typically be the case if SVCS 400 connects users across different networks.

FIG. 6 shows the architecture of an exemplary video encoder 600 that may be used for in error resilient video communication systems. Video encoder 600 may, for example, be a motion-compensated, block-based transform coder. An H.264/MPEG-4 AVC design is a preferred design for video encoder 600. However, other codec designs may be used. For example, FIG. 7 shows the architecture of an exemplary video encoder 600' for encoding base and temporal enhancement layers based on SVC designs, whereas FIG. 8 shows the architecture of an exemplary video encoder 600" for encoding spatial enhancement layers. (See e.g., PCT/US06/28365 and PCT/US06/028366). Video encoder 600' and 600" include an optional input downsampler 640, which can be utilized to reduce the input resolution (e.g., from CIF to CIF) in systems using spatial scalability.

FIG. 6 also shows a coding process, which may be implemented using video encoder 600. ENC REF CONTROL 620 in encoder 600 is used to create a "threaded" coding structure. (See e.g., PCT/US06/28365 and PCT/US06/028366). Standard block-based motion compensated codecs have a regular structure of I, P, and B frames. For example, in a picture sequence (in display order) such as IBBPBBP, the 'P' frames are predicted from the previous P or I frame, whereas the B pictures are predicted using both the previous and next P or I frame. Although the number of B pictures between successive I or P pictures can vary, as can the rate in which I pictures appear, it is not possible, for example, for a P picture to use as a reference for prediction another P picture that is earlier in time than the most recent one. H.264 is an exception in that the encoder and decoder maintain two reference picture lists. It is possible to select which pictures are used for references and also which references are used for a particular picture that is to be coded. The FRAME BUFFERS block 610 in FIG. 6 represents the memory that stores the reference picture list(s), whereas ENC REF CONTROL 620 determines—at the encoder side—which reference picture is to be used for the current picture.

The operation of ENC REF CONTROL 520 can be better understood with reference to FIG. 9, which shows an exemplary layered picture coding structure 900. In order to enable multiple temporal resolutions, the codec used in the video communications system may generate a number of separate picture "threads." A thread at a given level is defined as a sequence of pictures that are motion compensated using pictures either from the same thread, or pictures from a lower level thread. The use of threads allows the implementation of temporal scalability, since one can eliminate any number of top-level threads without affecting the decoding process of the remaining threads.

In a preferred embodiment of the present invention, a coding structure with a set of three threads is used (e.g., structure 900, FIG. 9). In FIG. 9, the letter 'L' in the picture labels indicates an arbitrary scalability layer. The numbers (0, 1 and 2) following L identify the temporal layer, for example, with "0" corresponding to the lowest, or coarsest temporal layer and "2" corresponding the highest or finest temporal layer. The arrows shown in FIG. 9 indicate the direction, source, and target of prediction. In most applications only P pictures will be used, as the use of B pictures increases the coding delay by the time it takes to capture and encode the reference pictures used for the B pictures. However, in applications that are not delay sensitive, some or all of the pictures could be B pictures with the possible exception of L0 pictures. Similarly, the L0 pictures may be I pictures forming a traditional group of pictures (GOP).

With continued reference to FIG. 9, layer L0 is simply a series of regular P pictures spaced four pictures apart. Layer L1 has the same frame rate as L0, but prediction is only allowed from the previous L0 frame. Layer L2 frames are predicted from the most recent L0 or L1 frame. L0 provides one fourth (1:4) of the full temporal resolution, L1 doubles the L0 frame rate (1:2), and L2 doubles the L0+L1 frame rate (1:1).

More or fewer layers than the three L0, L1 and L2 layers discussed above may be similarly constructed in coding structures designed to accommodate the different bandwidth/scalability requirements of specific implementations of the present invention. FIG. 10 shows an example in which a traditional prediction series of IPPP . . . frames is converted in a threaded coding structure 1000 with only two layers L0 and L1. Further, FIG. 11 shows an example of a threaded coding structure 1100 for spatial scalability. Coding structure 1100 includes threads for enhancement layers, which are denoted by the letter 'S'. It will be noted that the enhancement layer frames may have a different threading structure than the base layer frames.

Video encoder 600' (FIG. 7) for encoding temporal layers may be augmented to encode spatial and/or quality enhancement layers. (See e.g., PCT/US06/28365 and PCT/US06/028366). FIG. 8 shows an exemplary encoder 600" for the spatial enhancement layer. The structure and functions of encoder 600" are similar to that of the base layer codec 600', except in that base layer information is also available to the encoder 600". This information may consist of motion vector data, macroblock mode data, coded prediction error data, or reconstructed pixel data. Encoder 600" can re-use some or all of this data in order to make coding decisions for the enhancement layers S. The data has to be scaled to the target resolution of the enhancement layer (e.g., by factor of 2 if the base layer is QCIF and the enhancement layer is CIF). Although spatial scalability typically requires two coding loops to be maintained, it is possible (e.g., in the H.264 SVC draft standard) to perform single-loop decoding by limiting the data of the base layer that is used for enhancement layer coding to only values that are computable from the information encoded in the current picture's base layer. For example, if a base layer macroblock is inter-coded, then the enhancement layer cannot use the reconstructed pixels of that macroblock as a basis for prediction. It can, however, use its motion vectors and the prediction error values since they are obtainable by just decoding the information contained in the current base layer picture. Single-loop decoding is desirable since the complexity of the decoder is significantly decreased.

Quality or SNR scalability enhancement layer codecs may be constructed in the manner as spatial scalability codecs. For quality scalability, instead of building the enhancement layer on a higher resolution version of the input, the codecs code the residual prediction error at the same spatial resolution. As with spatial scalability, all the macroblock data of the base layer can be re-used at the enhancement layer, in either single- or dual-loop coding configurations. For brevity, the description herein is generally directed to techniques using spatial scalability. It will, however, be understood that the same techniques are applicable to quality scalability.

International patent application PCT/US06/28365 [SVC coding], incorporated by reference herein, describes the distinct advantages that threading coding structures (e.g., coding structures 900) have in terms of their robustness to the presence of transmission errors. In traditional state-of-the-art video codecs based on motion-compensated prediction, temporal dependency is inherent. Any packet losses at a given picture not only affects the quality of that particular picture, but also affects all future pictures for which the given picture acts as a reference, either directly or indirectly. This is because the reference frame that the decoder can construct for future predictions will not be the same as the one used at the encoder. The ensuing difference, or drift, can have tremendous impact on the visual quality produced by traditional state-of-the-art video codecs.

In contrast, the threading structure shown in FIG. 9 creates three self-contained threads or chains of dependencies. A packet loss occurring for an L2 picture will only affect L2 pictures; the L0 and L1 pictures can still be decoded and displayed. Similarly, a packet loss occurring at an L1 picture will only affect L1 and L2 pictures; the L0 pictures can still be decoded and displayed. Further, threading structures may be created to include threads or chains of dependencies for S pictures (e.g., FIG. 11). The exemplary S packets threading structure 1100 shown in FIG. 11 has similar properties as the L picture threading structure 900 shown in FIG. 9. A loss occurring at an S2 picture only affects the particular picture, whereas a loss at an S1 picture will also affect the following S2 picture. In either case, drift will terminate upon decoding of the next S0 picture.

With renewed reference to FIG. 9, a packet loss occurring at an L0 picture can be catastrophic in terms of picture quality, since all picture types will be affected. As previously noted, a traditional solution to this problem is to periodically code L0 pictures as intra or I pictures. However, the bandwidth overhead for implementing this solution can be considerable as the I pictures are typically 3-6 times larger than P pictures. Furthermore, the packet loss, which gives rise to the need to use an I picture, is often the result of network congestion. Attempting to send an I picture over the network to remedy the packet loss only exacerbates the congestion problem.

A better technique than using I picture transmissions to remedy packet loss is to code a certain percentage intra macroblocks of L0 as intra in any given picture. This technique helps to spread the bit rate load across a number of pictures instead of concentrating the load in a single picture. Macroblocks that have already been coded as intra in a given picture do not have to be forced to be coded as intra again in the same cycle. After a finite number of pictures, the receiver/decoder will have received intra information for all macroblock locations of the picture. In using this technique, care must be exercised at the encoder not to bring in distorted predictions to areas that have already been coded as intra via motion compensation (i.e., "safe" vs. "unsafe" frame areas). Thus, at the encoder, after a macroblock has been coded as intra for robustness purposes in a given cycle, future temporal predictions for the same frame area can only occur from locations that have also been already coded as intra in the same cycle. A good tradeoff can be achieved with about 10-15% of the macroblocks coded in intra mode in a given L0 picture. As a result, after about ten L0 frames (i.e., 40 pictures, or 1.3 secs at 30 frames per second) the decoder will have resynchronized with the encoder at the L0 layer. It should be noted that when the decoder joins a stream just after the intra refresh cycle begins, it will have to wait for the beginning of the next cycle as well as wait through completion of the next cycle, in order to synchronize (i.e., for a total delay of nearly two cycles). Due to the layer dependency of the picture coding structure (e.g., structure 900), subsequent L1 and L2 pictures will also be accurately decoded, as long as their data is accurately received. Consequently, if the base layer L0 and some enhancement layer pictures are transmitted in a way that their delivery is guaranteed, the remaining layers can be transmitted on a best-effort basis without catastrophic results in the case of a packet loss. Such guaranteed transmissions can be performed using known techniques such as DiffServ, and FEC, etc. In the description herein, reference also may be made to a High Reliability Channel (HRC) and Low Reliability Channel (LRC) as the two actual or virtual channels that offer such differentiated quality of service (FIG. 1). (See e.g., PCT/US06/28365 and PCT/US06/28366). In video communication systems which use scalable video coded structures (e.g., structure 1100, FIG. 11), layers L0-L2 and S0 may, for example, be reliably transmitted on the HRC, while S1 and S2 are transmitted on the LRC. Although the loss of an S1 or S2 packet would cause limited drift, it is still desirable to be able to conceal as much as possible the loss of information.

One drawback of this intra macroblocks coding technique is that under certain error conditions, it is possible that one of the L0 frames needed to achieve sufficient I blocks will be lost, thereby preventing convergence of the process. An additional drawback of this technique is that there is a coding efficiency penalty regardless of the conditions of the channel. In other words, the forced intra macroblocks will create a bandwidth overhead even if there is absolutely no packet loss in the communications.

The error resilience techniques of the present invention overcome the aforementioned limitations of the traditional techniques for compensating for packet loss by utilizing reliable transmission of a subset of the L0 layer or the entire L0 layer. Error resilience or reliability is ensured by retransmissions. The inventive error resilience techniques are designed not merely to recover a lost picture for display purposes, but are designed to create the correct reference picture for the decoding of future pictures that depend on the one that was contained (in whole or in part) in a lost packet. In system implementations of the present invention, the reliable transmission of the L0 pictures may be performed by LRP modules (e.g., FIG. 2, modules 270A and 270B, and FIG. 4, modules 470A and 470B) using positive or negative acknowledgments between the sending and receiving counterparts according to a suitable protection protocol (e.g., protocol 1400, FIG. 14).

FIG. 12 shows an exemplary picture coding structure 1200 in which the L0 base and L1-L2 temporal enhancement layers are coupled with at least one reliably transmitted base layer picture for error resilient video communications. In coding structure 1200, in addition to conventional base and enhancement picture types that are labeled as L0-L2 pictures, there is a new picture type called LR ('R' for reliable). It is noted that in coding structure 1200 shown in FIG. 12, the layers LR and L0-L2 can equivalently have been labeled as L0-L3, respectively, since the LR pictures always are the lowest temporal layer of the coded video signal. In accordance with the present invention for error resilient video communications, the LR pictures, which may be P pictures, are designated to be reliably delivered to receiver destinations.

The operation of the inventive error resilient techniques can be understood by consideration of an example in which one of the L0 pictures is damaged or lost due to packet loss. As previously noted, in traditional communication systems the effect of loss of the L0 picture is severe on all subsequent L0-L2 pictures. With the inventive picture coding structure 1200, the next "reliably-delivered" LR picture after a lost L0 picture offers a resynchronization point, after which point the receiver/decoder can continue decoding and display without distortion.

In the coding structure 1200 shown in FIG. 12, the temporal distance between the LR pictures is, for example, 12 frames. The reliable delivery of the LR pictures exploits the fact that P pictures with very long temporal distances (6 frames or more) are about half the size of an I picture, and that the reliable delivery is not intended to ensure timely display of the relevant picture, but instead is intended for creation of a suitable reference picture for future use. As a result the delivery of an LR picture can be accomplished by a very slight bandwidth increase in the system during the period between successive LR pictures.

Coding structure 1200 may be implemented using the existing H.264 AVC standard under which the LR pictures may, for example, be stored at a decoder as long-term reference pictures and be replaced using MMCO commands.

FIG. 13 shows an exemplary picture coding structure 1300 where the LR picture concept is applied to enhancement layer pictures (either spatial or quality scalability). Here, the pictures to be reliably transmitted are labeled SR, and as with LR pictures, they constitute the lowest temporal layer of the spatial or quality enhancement layer.

It is noted that although the LR pictures concept is generally described herein for purposes of illustration, as applied to the lowest temporal layer of the coded video signal, the concept can also be extended and applied to additional layers in accordance with the principles of the present invention. This extended application will result in additional pictures being transported in a reliable fashion. For example, with reference to FIG. 12, in addition to the LR pictures, the L0 pictures could also be included in the reliable (re)transmission mechanism. Similarly, pictures of any spatial/quality enhancement layers (from the lowest or additional temporal layers) may be included. Further, video sequence header or other data may be treated or considered to be equivalent to LR pictures in the system so that they (header or other data) are reliably transmitted. In the following, for simplicity in description we assume that only LR pictures are reliably transmitted, unless explicitly specified otherwise. However, it will be readily understood that additional layers or data can be reliably transmitted in exactly the same way.

It is desirable that the bandwidth overhead for the reliable delivery of the LR frames is zero or negligible, when there are no packet losses. This implies that a dynamic, closed-loop algorithm should be used for the reliable delivery mechanism. It may also be possible to use open loop algorithms, where, for example, an LR frame is retransmitted proactively a number of times.

FIG. 14 shows a preferred mechanism or protocol 1400 for the reliable delivery of the LR frames. Protocol 1400 employs a positive acknowledgment (ACK) message based mechanism to indicate to a sender (e.g., SENDER, SVCS1, or SVCS2) that a particular LR picture has been received by an intended receiver (e.g., SVCS1, SVCS2, or RECEIVER). With reference to the time axis shown in FIG. 14, a timer at the sender initiates a retransmit of a given LR picture if no acknowledgment has been received within a specified time interval (e.g., one round-trip time (RTT)). In addition to using a regular, periodic or static structure definition for LR pictures, it is also possible to employ a dynamic structure. In this case, LR pictures are defined dynamically in system operation. After a sender receives positive acknowledgments for receipt of a particular frame in a transmitted stream from all receivers, then the video communication system can designate this frame as an LR frame and use it as a new anchor or synchronization point. In other words, the sending encoder will employ a particular picture as an LR picture after all receivers have confirmed that they have received it correctly. The sender can abandon a particular LR picture if it becomes too old, and attempt to establish a new resynchronization point with a newer picture at any time. The operation of protocol 1200 is similar if negative acknowledgment (NACK) messages are used instead of positive ACK message. In this case, the sender retransmits a given picture immediately upon receiving a NACK.

When a SVCS is present in the communication system, it can optionally act as an aggregation point for the ACK messages. In such case, the SVCS may send only a single summary acknowledgment message to the sender ('aggregation mode') indicating that all intended upstream receivers have received the LR picture. This feature helps to minimize control message traffic between the different components of the communication system. Alternatively, the SVCS can act as a termination point for ACK messages ('ACK termination mode'). In this mode, an SVCS immediately acknowledges a received LR picture and caches it. The sender in this case does not expect further acknowledgments from other receivers upstream from the SVCS. The 'termination mode' SVCS then performs retransmissions to downstream SVCSs or receivers as needed to ensure reliable delivery, and removes the LR picture from its cache after all receivers have acknowledged reception. This mode can be exploited to isolate a particular receiver/endpoint with a problematic connection, so that communication between other endpoints is not affected. It is noted that in the ACK termination mode, it is no longer possible to dynamically define pictures as LR pictures at the sender, and hence a periodic or static LR structure definition would be appropriate in this case.

Details of the operation of exemplary protocol 1200 (with positive acknowledgments, but without ACK aggregation or termination) may be understood with reference to FIG. 14. The figure shows a sender and a receiver who, for example, communicate through two separate SVCS units 1 and 2. It will be understood that the operation of protocol 1200 is generally the same in systems where no SVCS is used (e.g., systems having direct connection between sender and receiver) and in systems where one or more SVCS are used.

With reference to FIG. 14, the sender transmits an L0 frame that is a candidate for LR status at time instant t0. The frame could be transported in one or more transport layer packets. For convenience in description herein, it may be assumed that a single packet is used. Further, the operation is identical if frame fragmentation is used, in which case retransmissions would affect the particular fragment that was lost, but not necessarily the entire frame.

The packet(s) containing the LR frame (LR) are expected to arrive at SVCS1 within a given time t1-t0. At that time, the sender expects SVCS1 to generate a positive acknowledgment message (ACK) for that frame. If no such ACK is received within the system's round-trip time (RTT), the sender assumes that the packet was lost and retransmits the LR frame at time t2. Assume that the frame is now received at SVCS1. An ACK will be generated for the sender by SVCS1, which will also forward the frame to SVCS2. Like the sender, SVCS1 will also go through a number of retransmissions of the frame until SVCS2 acknowledges its receipt. FIG. 14 shows that the LR frame is received by SVCS2 at time t6 by SVCS1. Then, SVCS2 will keep transmitting the frame to the receiver until it receives an ACK (e.g., ACK 1410) from the receiver (e.g., at time t8). When an end-user receiver (rather than an intermediary SVCS) receives an LR frame, it notifies the original sender that it now has this new, correctly received frame that it can use as a reference picture for the coding of future pictures. This ACK 1410 propagates through the SVCSs to reach the sender (e.g., at time t10). After all receivers in a particular video communications session acknowledge correct receipt of the new LR frame, the sender can then use the transmitted frame as a reference picture.

As previously noted, in the H.264 video coding standard, the use the transmitted frame as a reference picture is facilitated by marking candidate transmitted pictures as long-term reference pictures. Similar marking techniques can be used with other coding schemes. The candidate-transmitted pictures are not used as reference pictures until positive ACKs have been collected from all receivers. It is noted that throughout the time that the LR protocol 1400 is running, the sender keeps transmitting coded video. In other words, there is no additional end-to-end delay incurred due to the potential retransmissions required by the protocol. One of the objectives of the LR processing mechanism is to create a reliable reference picture for the coding of future pictures. In practice, it is possible that an original transmission of the LR picture is corrupted and is not properly displayed at a particular receiver. The sender (or SVCS) will keep retransmitting that picture until it is correctly received by the particular receiver, while the receiver will keep attempting to decode and playback the subsequent video frames that the sender will continue transmitting.

FIG. 15 shows the operation of a protocol 1500 using negative acknowledgments (NACK). The difference with the operation of the protocol using ACKs is that now the receiving endpoint or SVCS has the task of detecting when an LR picture is not received and has been lost. Specific techniques for loss detection in RTP and H.264 transmission are described later on herein (e.g., with reference to FIGS. 16-24). These techniques enable the detection of the loss upon receipt of any subsequent picture In the operation of protocol 1500, when the receiving endpoint or SVCS detects that an LR picture has been lost, it sends a NACK message to the transmitting endpoint or SVCS. The transmitting endpoint or SVCS then obtains the lost picture from its cache, and retransmits either the lost frame, or a more recent LR picture that will enable the receiver to resynchronize its decoder.

With continued reference to FIG. 15, assume that the picture coding structure of FIG. 9 is used (four temporal layers, LR and L0-L2), and that a sender and receiver communicate through an SVCS. Further, assume an LR picture transmitted by the sender at time t0 is lost, and the following picture, an L0 picture is successfully transmitted to the SVCS. Upon reception of the L0 picture, the SVCS detects that the referenced LR picture has been lost, and transmits a NACK which is received by the sender at time tR). In the meantime, the sender has also transmitted an L1 frame at time t2. Upon reception of the NACK at time tR, the sender retransmits the most recent LR picture to the SVCS. The sender continues to transmit the original picture stream at the appropriate time intervals, e.g., an L2 picture at time t3 and an L1 picture at time t4. It is noted that the SVCS immediately forwards to the downstream receiver any pictures that it has successfully received from the sender, regardless of whether the required LR pictures have been lost. Assuming all such transmissions to the receiver are successful, then when the retransmitted LR picture is received at the receiver, the receiver will have all information necessary to decode the L0 and L1 pictures received at earlier times t3 and t4. Although it may be too late to display these pictures, the receiver (e.g., in "recovery mode" where it is decoding pictures but not displaying them) can decode them in order to have the correct reference picture for correct decoding of the L2 picture that arrives at time t5. This decoding may be accomplished faster than real-time, if the receiver has sufficient CPU power. At time t5 the receiver can then start normal decoding and display of the incoming video signal with no errors, and without incurring any delay due to the loss. It will be noted that if the receiver elected instead to display the LR, L0, and L1 pictures prior to the L2, then the normal (without losses) end-to-end delay of the communication session would be increased by the amount of time that it took for the SVCS to recover the lost LR picture. This additional delay is undesirable in interactive communications, and its elimination is one of the benefits of the present invention.

Using RTCP or other feedback mechanisms, the sender can be notified that a particular receiver is experiencing lost packets using, for example, the positive and negative acknowledgment techniques described above. The feedback can be as detailed as individual ACK/NACK messages for each individual packet. Use of feedback enables the encoder to calculate (exactly or approximately) the state of the decoder(s), and act accordingly. This feedback is generated and collected by a Reliability and Random access Control (RRC) module 530 (FIG. 6). The RRC module can then instruct the encoder to use intra macroblocks, or increase their frequency, as appropriate, to further aid the synchronization process when needed.

When positive acknowledgments are used, and in order to enable a receiver who has experienced lost packets to resynchronize to the coded bitstream, the sender can elect to encode a current frame using the most recent LR picture as a reference picture. With the knowledge that this LR picture has been reliably received, the sender can encode the current picture as a P picture using the LR picture as a reference. After the receiver correctly receives the current picture, it can from that point forward be synchronized with the encoder in terms of the contents of the reference picture buffers. In other words, any drift present in the decoder will be eliminated.

Similarly, when negative acknowledgments are used, the decoder can resynchronize with the bitstream by decoding all necessary reference pictures of a given picture, even if they arrive too late to be displayed. If the decoder can decode pictures faster than real-time (in other words, the decoding time takes less than the time between pictures) then it will eventually synchronize with the received bitstream. By initiating display at the synchronization point, the decoder can continue normal decoding and display operations without any additional end-to-end delay being added to the communication session.

These techniques for resynchronization of a receiver have distinct advantages in medium to large video conferences involving, for example, more than 5-10 participants. In such conferences, using an I frame to enable resynchronization of a receiver that has experienced packet loss would impose a considerable bandwidth penalty on all participants. In effect, the participant on the weakest link (i.e., the one with the most errors) would dictate the quality of the participant with the strongest link. By using LR pictures, use of intra pictures is eliminated. Although P pictures based on LR pictures also have a bandwidth overhead, as long as the temporal distance between the frames is not too large, the overhead is significantly smaller than for I pictures. The LRP technique for resynchronization also adapts to system parameters such as round trip delay, distribution of servers etc. The better the system, the faster the LR pictures will be established as accurately received at the receivers leading to better prediction for LR-based pictures which in turn will results in smaller overhead.

It is noted that when feedback is used, it may not be necessary to a priori decide the structure of LR frames. In practice, the structure of LR frames can be statistically and dynamically established by collecting and collating feedback from all receivers. Frames that are acknowledged as received by all receivers can automatically be considered to be LR frames.

A drawback of LR pictures is that, in some cases, a single poor connection to a videoconference can still drive the quality down for all participants involved. In such cases, intermediate SVCSs can play the role of sender proxies and keep re-transmitting the required data while the remaining participants continue the conference unaffected. For example, in the event that the connection of a forwarding SVCS to an adjoining SVCS or connected endpoint is such that the time to achieve positive acknowledgment from its peer is larger than a pre-configured value, the forwarding SVCS may be configured to treat that endpoint as if it did send back a positive acknowledgment (including sending back appropriate ACKs). This configuration limits the effect of a problematic endpoint or SVCS connection on the overall system. From that time on, the forwarding SVCS will only transmit LR frames to its problematic peer, since it is the minimum information needed to eventually resynchronize with the decoding process. If newer LR frames are arriving at the forwarding SVCS from a sender, they will continue to be retransmitted to the problematic SVCS or endpoint, thereby giving the problematic SVCS or endpoint further chances to synchronize with sender bit stream. Since no other frames (apart from the LRs) are transmitted on this link, no additional congestion can arise from such retransmission. In practice, if the number of such cached and retransmitted LR frames exceeds a certain pre-defined number (e.g., 2-3) the forwarding SVCS may consider the particular problematic SVCS or endpoint connection to be terminated. The terminated SVCS or endpoint will then have to use any suitable random-entry mechanism available to it to re-join the video conferencing session.

In the event that the connection or link interruption is temporary, the receiving endpoint can decode the retransmitted LR frames in their right order and re-join the session. It is expected that since the number of LR frames is much smaller than the total number of frames, the CPU load will not be an issue and the receiving endpoints can catch up with the decoding process.

It will be understood that protocol 1400 shown in FIG. 14 is exemplary and that it can be readily modified for further system performance improvements. For example, in a modified protocol 1400, the acknowledgments that propagate all the way back to the sender (e.g., ACK[RCVR] message shown in FIG. 14) do not have to originate from the receiving endpoints but can originate only from the last SVCSs closest to the endpoints in the chain. The last SVCS, which is connected to endpoints, can first send back the ACK[RCVR] and then proceed to reliably transmit or retransmit the LR frame to the endpoints as described above. This modification of protocol 1400 avoids having to wait for the pre-configured time before sending back the ACK[RCVR].

As will be obvious to those skilled in the art, the ARQ protocol (e.g., protocol 1400) used to implement the reliable transmission of LR frames can be replaced by other suitable transport layer mechanisms in accordance with principles of the present invention. Suitable transport layer mechanisms for the reliable transmission of LR frames include mechanisms such as proactive retransmission, and more sophisticated FEC (forward error correction) techniques such as Reed-Solomon codes with interleaving, and hybrid FEC-ARQ techniques (See e.g., Rubenstein et al., Computer Comm. Journal, March 2001).

An important consideration in implementations of the present invention is how a receiver (e.g., a receiving endpoint or SVCS) detects that an LR picture has been lost with a minimal delay. The present invention includes a technique that is based on picture numbers and picture number references. The technique operates by assigning sequential numbers to LR pictures, which are carried together with the LR picture packets. The receiver maintains a list of the numbers of the LR pictures it has received. Non-LR pictures, on the other hand, contain the sequence number of the most recent LR picture in decoding order. This sequence number reference allows a receiver to detect a lost LR picture even before receipt of the following LR picture. When a receiver receives an LR picture, it can detect if it has lost one or more of the previous LR pictures by comparing its picture number with the list of picture numbers it maintains (the number of the received picture should be one more from the previous one, or 0 if the count has restarted). When a receiver receives a non-LR picture, it tests to see if the referenced LR picture number is present in its number list. If it is not, it is assumed to be lost and corrective action may be initiated (e.g., a NACK message is transmitted back to the sender).

LR pictures may be identified as such using a flag or other signaling means (e.g., derived by other packet header or packet payload parameters), or their presence may be implied (e.g., by their order in the coded video sequence). As an illustration of the use of LR picture numbers, assume a sequence of two pictures LR and L0 that are transmitted in this order. The receiver's number list is initially empty. Further assume that the LR picture is assigned a sequence number 0. The LR picture will be transmitted with the number 0 indicated in its packet. The L0 picture will also be transmitted with the same number 0 as a reference to the LR picture it depends on, which is the most recent LR picture. If the LR picture is lost, the receiver will receive frame L0 which contains a reference to an LR picture with number 0. Since this number is not in its list (the list is still empty), the receiver detects that the LR picture with number 0 has been lost. It can then request retransmission of the lost LR picture.

It is noted that detection of lost LR pictures using the LR picture number technique can be performed both at a receiving endpoint as well as an intermediate SVCS. The operation is performed, for example, at the LRP (Rcv) modules 270B (FIGS. 2 and 3), or modules 470B (FIG. 4).

Two different embodiments of the LR picture numbering technique are described herein. One embodiment (hereinafter referred to as the 'R packets' technique) is appropriate when the RTP protocol is used by the system for transmission. The other embodiment is applicable when the H.264 Annex G (SVC) draft standard is used for the system.

For the R packets technique, assume that the RTP protocol (over UDP and IP) is used for communication between two terminals, possibly through one or more intermediate servers. Note that the media transmitting terminal may perform real-time encoding, or may access media data from local or other storage (RAM, hard disk, a storage area network, a file server, etc.). Similarly, the receiving terminal may perform real-time decoding, and it may be storing the received data in local or other storage for future playback, or both. For the description herein, it is assumed, without limitation, that real-time encoding and decoding are taking place.

FIG. 16 shows the architecture of the transmitting terminal's LRP Snd module (e.g., module 270A, FIG. 2). LRP Snd module includes a packet processor (R-Packet Controller 1610) with local storage (e.g., buffer 1605) for packets that may require retransmission). R-Packet Controller 1610 marks the R packets and also responds to RNACKs. The R Packet Controller is connected to a multiplexer MUX 1620 and a demultiplexer DMUX 1630 implementing the RTP/UDP/IP protocol stack. Although MUX 1620 and DMUX 1630 are shown in FIG. 16 as separate entities, they may be combined in the same unit. MUX 1620 and DMUX 1630 are connected to one or more network interface controllers (NICs) which provide the physical layer interface. In a preferred embodiment, the NIC is an Ethernet adapter, but any other NICs can be used as will be obvious to persons skilled in the art.

Similarly, FIG. 17 shows an exemplary architecture of the receiving terminal's LRP Rcv module (e.g., module 270B, FIG. 2). The R-Packet Controller here (e.g., controller 1610') is responsible for packet loss detection and generation of appropriate NACK messages. Further, FIG. 18 shows the structure of the server's LRP Snd and Rcv modules (e.g., modules 420A and 420B, FIG. 4), which may be the same as components of a receiving terminal and that of a transmitting terminal connected back-to-back.

In a preferred embodiment, the transmitting terminal packetizes media data according to the RTP specification. It is noted that that although different packetization (called "payload") formats are defined for RTP, they all share the same common header. This invention introduces a named header extension mechanism (see Singer, D., "A general mechanism for RTP Header Extensions," draft-ietf-avt-rtp-hdrext-01 (work in progress), February 2006) for RTP packets so that R packets can be properly handled.

According to the present invention, in an RTP session containing R packets, individual packets are marked with the named header extension mechanism. The R packet header extension element identifies both R packets themselves and previously-sent R packets. This header extension element, for example, has the name "com.layeredmedia.avt.r-packet/200606". Every R packet includes, and every non-R packet should include, a header extension element of this form.

FIG. 19 shows an exemplary data field format of the inventive named header extension, in which the fields are defined as follows.

ID: 4 bits
    The local identifier negotiated for this header extension element, as defined, for example, in Singer, D., "A general mechanism for RTP Header Extensions," draft-ietf-avt-rtp-hdrext-01 (work in progress), February 2006.

Length (len): 4 bits
    The length minus one of the data bytes of this header extension element, not counting the header byte (ID and len). This will have the value 6 if the second word (the superseded range) is present, and 2 if it is not. Thus, its value must either be 2 or 6.

R: 1 bit
    A bit indicating that the packet containing this header extension element is an R packet in series SER with R sequence number RSEQ. If this bit is not set, the header extension element instead indicates that the media streams most recent R packet in series SER had R sequence number RSEQ. If this bit is not set, the superseded range should not be present (i.e. the len field should be 2) and must be ignored if present.

Reserved, Must Be Zero (MBZ): 3 bits
Reserved bits. These must be set to zero on transmit and ignored on receive.
Series ID (SER): 4 bits
An identifier of the series of R packets being described by this header extension element. If a media encoder is describing only a single series of R packets, this should have the value 0. For example, using the scalable video picture coding structure shown in FIG. 13, L packets (base spatial enhancement layer, all threads) would have SER set to, say, 0, and S packets (spatial enhancement layer, all threads) would have SER set to 1.
R Packet Sequence Number (RSEQ): 16 bits
An unsigned sequence number indicating the number of this R packet within the series SER. This value is incremented by 1 (modulo $2^{16}$) for every R packet sent in a given series. RSEQ values for separate sequences are independent.
Start of Superseded Range (SUPERSEDE_START): 16 bits
The R sequence number of the earliest R packet, inclusive, superseded by this R packet, calculated modulo $2^{16}$. (Since this value uses modulo arithmetic, the value RSEQ+1 may be used for SUPERSEDE_START to indicate that all R packets prior to the end of the superseded range have been superseded.) This field is optional, and is only present when len=6.
End of Superseded Range (SUPERSEDE_END): 16 bits
The R sequence number of the final R packet, inclusive, superseded by this R packet, calculated modulo $2^{16}$. This value must lie in the closed range [SUPERSEDE_START . . . RSEQ] modulo $2^{16}$. This field is optional, and is only present when len=6.

An RTP packet may contain multiple R packet mark elements, so long as each of these elements has a different value for SER. However, an RTP packet must not contain more than one of these header extension elements with the R bit set, i.e. an R packet may not belong to more than one series.

All RTP packets in a media stream using R packets should include a mark element for all active series.

When the second word of this header extension element is present, it indicates that this R packet supersedes some previously-received R packets, meaning that these packets are no longer necessary in order to reconstruct stream state. This second word must only appear in a header extension element which has its R bit set.

An R packet can only supersede R packets in the series identified by the element's SER field. R packets cannot supersede packets in other series.

It is valid for a superseded element to have SUPERSEDE_END=RSEQ. This indicates that the R packet supersedes itself, i.e., that this R packet immediately becomes irrelevant to the stream state. In practice, the most common reason to do this would be to end a series; this can be done by sending an empty packet (e.g. an RTP No-op packet, see Andreasen, F., "A No-Op Payload Format for RTP," draft-ietf-avt-rtp-no-op-00 (work in progress), May 2005.) with the superseded range (SUPERSEDE_START, SUPERSEDE_END)=(RSEQ+1, RSEQ), so that the series no longer contains any non-superseded packets.

The first R packet sent in a series should be sent with the superseded range (SUPERSEDE_START, SUPERSEDE_END)=(RSEQ+1, RSEQ−1), to make it clear that no other R packets are present in the range.

R packets may redundantly include already-superseded packets in the range of packets to be superseded.

The loss of R packets is detected by the receiver, and is indicated by the receiver to the sender using an RTCP feedback message. The R Packet Negative Acknowledgment (RNACK) Message is an RTCP Feedback message (see e.g., Ott, J. et al., "Extended RTP Profile for RTCP-based Feedback (RTP/AVPF)," RFC 4585, July 2006) identified, as an example, by PT=RTPFB and FMT=4. Other values can be chosen, in accordance with the present invention. The FCI field must contain at least one and may contain more than one RNACK.

The RNACK packet is used to indicate the loss of one or more R packets. The lost packet(s) are identified by means of a packet sequence number, the series identifier, and a bit mask.

The structure and semantics of the RNACK message are similar to that of the AVPF Generic NACK message.

FIG. 20 shows the exemplary syntax of the RNACK Feedback Control Information
(FCI) field in which individual fields are defined as follows:
R Packet Sequence Number (RSEQ): 16 bits
The RSEQ field indicates a RSEQ value that the receiver has not received.
Series ID (SER): 4 bits
An identifier of which sequence of R packets is being described as being lost by this header extension element.
Bitmask of following Lost R Packets (BLR): 12 bits
The BLR allows for reporting losses of any of the 12 R Packets immediately following the RTP packet indicated by RSEQ. Denoting the BLP's least significant bit as bit 1, and its most significant bit as bit 12, then bit i of the bit mask is set to 1 if the receiver has not received R packet number (RSEQ+i) in the series SER (modulo $2^{16}$) and indicates this packet is lost; bit i is set to 0 otherwise. Note that the sender must not assume that a receiver has received an R packet because its bit mask was set to 0. For example, the least significant bit of the BLR would be set to 1 if the packet corresponding to RSEQ and the following R packet in the sequence had been lost. However, the sender cannot infer that packets RSEQ+2 through RSEQ+16 have been received simply because bits 2 through 15 of the BLR are 0; all the sender knows is that the receiver has not reported them as lost at this time.

When a receiver detects that it has not received a non-superseded R packet, it sends an RNACK message as soon as possible, subject to the rules of RTCP (see e.g., Ott, J. and S. Wenger, "Extended RTP Profile for RTCP-based Feedback (RTP/AVPF)," draft-ietf-avt-rtcp-feedback-11 (work in progress), August 2004). In multipoint scenarios, this includes listening for RNACK packets from other receivers and not sending an RNACK for a lost R packet that has already been reported.

When a sender receives an RNACK packet, it checks whether the packet has been superseded. If it has not been superseded, the sender retransmits the packet for which an RNACK was sent (using, e.g., the RTP retransmission payload, see Rey, J. et al., "RTP Retransmission Payload Format," RFC 4588, July 2006). If the packet has been superseded, it retransmits the most recent packet whose R packet element indicated a superseded packet range including the packet requested.

A sender may choose to generate and send a new R packet superseding the one requested in an RNACK, rather than retransmitting a packet that has been sent previously.

If, after some period of time, a receiver has not received either a retransmission of the R packet for which an RNACK was sent, or an R packet superseding that packet, it should retransmit the RNACK message. A receiver must not send RNACK messages more often than permitted by AVPF. It should perform estimation of the round-trip time to the sender, if possible, and should not send RNACK messages more often than once per round-trip time. (If the receiver is also acting as an RTP sender, and the sender is sending RTCP reception reports for the receiver's stream, round-trip times can be inferred from the sender report's LSR and DLSR fields.) If the round-trip time is not available, receivers should not send RNACK messages more often than a set time period. A potential value is 100 milliseconds, although other values may be suitable depending on the application environment, as is obvious to persons skilled in the art.

The RNACK mechanism described above can also be applied as positive acknowledgment 'RACK' messages. In this case, a receiver indicates to the sender which packets have been correctly received. The same design as RNACK messages can be used for these 'RACK' messages, with appropriate changes to the semantics of the packet header, in accordance with the principles of the invention. The RACK messages may have payload specific interpretation, e.g., they can correspond to slices or entire frames. In such a case, a RACK message has to acknowledge all the individual packets that are involved with the relevant slice or frame.

It is also possible to combine the use of RACK and RNACK messages in the same system.

The R-packet technique has several advantages. First, it enables a sender to indicate a subset of the packets in a generated RTP stream as being high-priority (R) packets.

It further enables a receiver to determine when it has lost R packets, whenever any packet of the stream is received, and regardless of the dependency structure of the encoded stream.

It also enables a receiver to indicate to a sender when it has lost R packets. This is accomplished by negatively acknowledging any packets that are identified as lost. Optionally R packets that are received can be positively acknowledged by the receiver.

In addition, it enables a receiver to determine that it has not lost any R packets as of the latest packet that has been received, regardless of how many other non-R packets have been lost.

Yet another advantage is that it enables an sender to split a frame into any number of R packets, either in a codec-aware manner (e.g. H.264 slices) or a codec-unaware manner (e.g. RFC 3984 fragmentation units).

Another advantage is that it enables a sender to state that an R packet supersedes previous R packets, i.e. that some previous R packets are no longer necessary in order to establish the stream state. This includes both being able to state that all R packets before a given one have been superseded, and that a range of R packets are superseded.

Finally, another advantage is that it allows an encoder to apply forward error correction (FEC) (see. e.g., Li, A., "RTP Payload Format for Generic Forward Error Correction," draft-ietf-avt-ulp-17 (work in progress), March 2006.) to its media stream, either to all packets or selectively only to R packets, in a way that allows R packet state to be recovered from the FEC stream.

The second exemplary detection technique, which allows a receiver to detect that an LR picture (including SR pictures) has been lost with a minimal delay, is applicable to the systems based on the H.264 Annex G (SVC) draft standard. In such case H.264 Annex G (SVC) NAL units are used as the basis for transmission. The current design of H.264 SVC does not carry enough information to allow a receiver to determine whether or not all of a stream's lowest temporal layer (R), or "key pictures" in H.264 SVC terminology, have been received. For example, with reference to FIG. 21, frame 0 and frame 3 are both key pictures which store themselves in position 0 in the long-term reference buffer. Frame 4 references position 0 in the long-term reference buffer. If frame 3 is completely lost, frame 4 is not correctly decodable. However, there is no way for a receiver under the H.264 Annex G (SVC) draft standard to know this; the receiver will operate as if it can use frame 0 as the reference picture for frame 4, and thus display an incorrect image.

A mechanism for enabling the decoder to detect frame loss is to assign consecutive frame numbers or indices to key pictures, and have non-key pictures indicate the most recent key picture by referencing its frame index. By examining key picture indices, a stream receiver can determine whether it has indeed received all of a stream's key pictures up to the current frame. A number of possibilities exist for providing frame index information in the H.264 SVC syntax. Two alternative embodiments are described below with reference to FIGS. 23 and 24.

FIG. 22 shows the structure of the SVC NAL header extension, as defined in the current H.264 Annex G draft (see e.g., T. Wiegand, G. Sullivan, J. Reichel, H. Schwarz, M. Wien, eds., "Joint Draft 7, Rev. 2: Scalable Video Coding," Joint Video Team, Doc. JVT-T201, Klagenfurt, July 2006, as amended by J. Reichel, D. Santa Cruz, and F. Ziliani, "On High Level Syntax," Joint Video Team, Doc. JVT-T083 (as amended), Klagenfurt, July 2006, both of which documents are incorporated herein by reference in their entireties). FIG. 22 shows the structure of the 3-byte header, as well as the names of the individual fields and their bit length. The dependency_id (D), temporal_level (T), and quality level (Q) fields indicate points in the spatial/coarse grain quality, temporal, and fine-grain quality dimensions respectively. In other words, they indicate the position of the NAL's payload in the set of resolutions provided by the scalable encoder. It is noted that the base layer in this scheme is identified by D=Q=T=0.

Further, it is noted that when T=Q=0, the fragmented_flag, last_ftagment_flag, and fragment_order fields have no use since they are relevant only for FGS coded data (Q>0). The fields provide a total of 4 bits. If the trailing reserved_zero_two_bits are included, the total is 6 bits. Similarly, when T>0 but Q=0, the fields fragmented flag, last_fragment_flag and fragment_order are not used, for a total of 4 bits. If we add the trailing reserved bits the total is 6 bits. By noting that the condition T=Q=0 corresponds to a key picture, and T>0 but Q=0 corresponds to a non-key picture, we see that there are several bits that can be used to introduce frame numbering. The number of bits that can be used is limited by the non-key picture bits.

FIG. 23 shows the structure of the modified SVC NAL extension header, in accordance to an exemplary technique for providing frame index information in the H.264 SVC syntax. It will be noted that the length of the header is not changed; some of the bits, however, are interpreted differently depending on the values of the T and Q fields. With T=0 and Q=0, the F, LF, FO, and R2 fields are interpreted as an F1 field (key_picture_frame_idx), which specifies the key picture frame index assigned to the current access unit. With T>0 and Q=0, the F, LF, FO, and R2 fields are interpreted as an LFI field (last_key_picture_frame_idx), which specifies the key_pic_frame_idx of the most recent key picture with respect to the current access unit, in decoding order.

Using 6 bits for non-key pictures, allows representation of 64 consecutive frame numbers. With a key picture period as low as 4 at 30 frames per second, the frame numbers cycle every 8.4 seconds. The minimum cycle time is 4.2 sec, corresponding to a key picture period of 2. Clearly, longer times provide more robustness since the chances for duplication of frame numbers between reference pictures and arriving pictures are reduced.

The second embodiment of the technique for providing frame index information in the H.264 SVC syntax allows frame indices of larger lengths by using one of the reserved bits as an extension flag, which, when set, signals the presence of additional bits or bytes in the header. FIG. 24 shows an exemplary SVC NAL header extension structure of this embodiment, in which the last bit of the original 3-byte header is now used as an extension flag (EF, extension_flag). When the EF flag is set, an additional byte is present in the header. This additional byte is interpreted as an FI or LFI field, depending on the value of the T field (temporal_level).

In both embodiments (3-byte or 4-byte SVC NAL header extension), the FI field values are increasing and satisfy the following constraints:
If the current picture is an IDR picture, the FI value shall be equal to 0; and
Otherwise, i.e., if the current picture is not an IDR picture, let PrevTL0FrameIdx be equal to the FI value of the most recent picture with T equal to 0 in decoding order. The value of FI for the current picture shall be equal to: (PrevTL0FrameIdx+1)%256. The number 256 represents the dynamic range of the F1 field (maximum value+1), and should be adjusted for different FI field lengths to the value $2^{\wedge}$(FI Length in bits).

Alternative mechanisms for indicating the R picture frame index value and referring to it in non-R pictures in accordance with the present invention will be obvious to persons skilled in the art, both within an RTP transmission context and an H.264 SVC NAL transmission context.

Attention is now directed to alternative embodiments for the use of LR pictures for reliable transmission and random access in video communication systems (e.g., FIG. 1). In an alternative embodiment of the present invention, the SVCS units may be configured to facilitate reliable transmission of LR pictures by decoding all LR pictures and retaining the most recent one in a buffer. When a receiver experiences packet loss, it can request from the SVCS a copy of the most recent LR picture. This picture can now be coded as a high quality intra picture at the SVCS and transmitted to the receiver. This coded picture is referred to as an intra LR picture. Although the bandwidth overhead can be high, it will only affect the link between the particular SVCS and the receiver who experienced the packet loss. The intra LR picture can be subsequently used by the receiver as a good approximation of the actual reference picture that should have been contained in its reference picture buffer. To improve the approximation the intra coding should preferably be of very high quality. The SI/SP technique supported by H.264 can also be used to provide an accurate rendition of the required reference frame for synchronization to the bitstream. In this case both SI and SP pictures have to be generated by the encoder. The SI picture is used by receivers who have not received the SP picture. By construction, use of the SI/SP picture mechanism is drift free. Note that although the SI/SP mechanism is currently supported only by H.264 AVC, one can apply exactly the same methodology for SVC-type (scalable) coding. The SI picture may be cached by the SVCS and provided only to new participants.

In cases where the SVCS closest to the receiving end-user does not have the computational power to keep decoding LR pictures (or L0 pictures if LR pictures are not present), the task can be assigned to an SVCS at an earlier stage of the transmission path. In extreme cases, the assignment (and associated request by the end-user) may be done at the sender itself.

It is noted that that the match between regularly decoded pictures and those decoded after the use of an intra LR picture will not be necessarily exact (unless SI/SP frames are used). However, in combination with intra macroblocks, the video communication system can gradually get back in synchronization while visual artifacts that would be present during the transmission are greatly reduced. A benefit of this technique is that it localizes error handling completely on the link that experiences the packet loss. As a result, other participants suffer absolutely no penalty in the quality of their video signal.

The above error resilience techniques also can be used to provide random access to a coded video signal. For example, in the videoconferencing example shown in FIG. 1, when end-user 3 joins an existing videoconference between end-users 1 and 2, end-user 3 will start receiving coded video steams from both end-users 1 and 2. In order to be able to properly decode these streams, the video decoder at end-user 3 must be synchronized with the decoders at end-users 1 and 2. This requires that the reference picture buffer at end-user 3 is brought in line with the ones used at end-users 1 and 2.

As previously noted, the use of intra pictures is not attractive due to the large impact that they can have on the system bandwidth, especially for medium to large conferences. The alternative technique of intra macroblocks can be used to enable resynchronization within a small period of time.

In an embodiment of the present invention, server-based intra LR pictures are directly used for random access. When a participant first joins a conference, it immediately requests such an intra LR picture, and then enters an error recovery mode (as if a packet was lost). With simultaneous use of intra macroblocks, the decoder will quickly synchronize with the encoder, whereas during the time it is in error recovery mode the visual artifacts will be minimized. Note that the sending encoder knows when a new user joins a communication session through the session's signaling mechanism, and can thus initiate use of intra macroblocks or increase their frequency as appropriate. This is accomplished, for example, through RRC module 630 shown in FIG. 6. Hence the potential reduction in coding efficiency associated with intra macroblocks is limited only to the duration a new user joins a session.

The computational complexity caused by server-based intra pictures is not very large. Assuming that one out of every three L0 frames is an LR frame, only 8% of the frames need to be decoded. Encoding would only be necessary for a small fraction of the frames. In practice, encoding may be necessary for 10% or less of the frames if the focus is only on random access issues (e.g., participants changing resolution, or subscribing to a session). Encoding may be further limited to any desired value by limiting the frequency at which an I frame is generated per processed stream. For example, assuming 8% of the frames are decoded and 2% are encoded (corresponding to random entry every 48 frames), the total complexity is lower than 3.5% (8%×25%+2%×75%=3.5%, assuming encoding complexity is 3 times that of decoding) compared to the traditional implementation of a transcoding MCU/server, which has to decode and encode a full stream. Like a traditional transcoding MCU, the server-based intra LR picture technique can isolate an intra frame request (e.g., for both error recovery, random access, and also change of picture size) from the transmitter, and thus limit the impact of such an intra request to other participating endpoints.

As previously noted, if a server does not have the CPU power for server-based intra picture processing, or if the server is not subscribed to the required stream in a conference session, the intra picture request can propagate to the next SVCS (i.e., closer to the transmitter of the particular video stream). The intra picture request can even propagate to the sender/transmitter itself, if none of the servers in the system has suitable intra picture processing functionality.

Server-based intra LR picture-based videoconferencing retains the advantages of scalable video- and simulcast-based videoconferencing. The advantages include minimal server delay because no jitter buffers are needed (even with LR pictures), improved error resilience, and complexity which is one order of magnitude less than that of a traditional MCU.

The LR and server-based intra LR picture techniques described above are also directly applicable to spatial scalability and SNR or quality scalability. The LR picture and server-based intra LR picture concepts can apply to any of the spatial or quality layers. For example, FIG. 13 shows an exemplary picture coding structure 1300 with three temporal layers and two spatial or quality layers. In addition to error resilience and random access, spatial scalability and SNR scalability require consideration of layer switching. The need for layer switching may, for example, arise when an end user that is viewing a participant at CIF resolution decides to switch to QCIF, or vice versa. Layer switching is similar, but not identical, to error resilience and random access. The correlation between the different resolutions (spatial or quality) can be advantageously used to create effective layer switching mechanisms.

It will be noted that in spatial scalability it is possible to operate a receiver in a single loop, as currently investigated in the H.264 SVC standardization effort. Single loop operation is possible, if the prediction performed at high resolution does not use any low resolution information that requires applying motion compensation at the low resolution. In other words, the prediction can use intra macroblocks, motion vectors, prediction modes, decoded prediction error values, but not the actual decoded pixels at the lower resolution. While single-loop decoding makes scalable decoders less complex from a computation point of view, it makes switching from low-to-high or high-to-low resolution a non-trivial problem. The alternative to single-loop decoding is multi-loop decoding, in which the received signal is decoded at two or more of the received resolutions. Multi-loop decoding significantly increases the decoding complexity, since it is similar to operating multiple decoders at the same time (one per decoded resolution).

In many videoconferencing applications, frequent switching between resolutions is necessary. For example, consider a dynamic layout in a medium size conference in which 5 people participate, and where the speaker is presented in a large window and the other participants are presented in a smaller window. By using LR pictures at both resolutions, a decoder can maintain decoding loops that approximate the content of the reference picture buffers at both resolutions, which are exact at the LR time points. When switching from one resolution to another, the LR picture can be used as a starting point for decoding into the other resolution. Assuming that LR pictures are one out of every 4 L0 pictures, then the transition occurs within 0.4 sec while the computational overhead is less than 10% of a single-loop decoding (1/12th, to be exact). When decoders are only 'subscribed' to LR frames, the SVCS may transmit the LR frames broken down to smaller pieces to the decoders. The smaller pieces may be spread between all frames over the LR cycle to maintain smooth bit rate on a given link. Alternatively, the SVCS may spread over time the different LR frames from multiple streams.

Intra macroblocks at both resolutions can also be used to facilitate layer switching. Assume an endpoint wants to go from low to high resolution. It will keep decoding the low resolution signal and display it in high resolution (up-sampled), while at the same time it will start decoding the high resolution signal in an "error recovery" mode but without displaying it. When the receiver is confident that its high resolution decoding loop is in sufficient synchrony with the encoder, it may switch the display to the decoded high resolution pictures and optionally stop decoding the low resolution loop. Conversely, when going from the high resolution to the low resolution, the receiver may use the high resolution picture as a good reference picture for the low resolution coding loop and continue in regular error recovery mode (with display) at the low resolution. This way the endpoint will avoid having to keep receiving the high resolution data.

One potential drawback of using intra macroblocks is that it creates a tradeoff between the switch or entry time and the amount of overhead imposed on current receivers of the stream. The faster the switch, the bigger the overhead will be for current receivers. The method described above or generating an intra frame on the server is one possible way to effectively circumvent this trade off, but it does require additional media processing on the server. Other methods under the present invention are the following:

Method (a), in which intra macroblocks are included in LR/SR frames (such that low speed switching or entry will be possible with a very low overhead), while the SVCS caches the LR/SR frames. When a new receiver enters the stream, the SVCS provides it just these frames so that the receiver can decode them faster then real time (typically 1:8) and shorten the entrance time.

Method (b), where additionally to Method (a), the SVCS removes inter macroblocks present in the cached LR/SR streams that will be redundant for the receiver due to subsequent I macroblocks. This can be more easily accomplished if the LR/SR frames are prepared by the encoder in slices, so that this operation will only require omission of such redundant inter slices. Both these methods (a) and (b) are in referred to in the following description as "intra macroblocks fast-forward."

FIG. 25 shows the operation of intra macroblocks fast-forward. The figure shows LR pictures 2500 (LR i through i+2) at three successive time instants t=i through i+2, each coded as three separate slices. At each time instant, one of these three slices is coded as intra (A). When taken in combination, the three pictures together provide the decoder at least one intra version for each macroblock. For use in creating a reference picture, in addition to the intra slices A, the decoder also must receive the shaded slices (B) shown in the picture. These shaded slices are predicted using macroblock data from the preceding slice at the same location. In implementing fast-forward intra recovery, the server needs to cache any successive LR pictures that provide such intra slice coding. Upon request from the receiver, the server only needs to transmit the intra slices as well as the shaded slices B indicated in FIG. 25. The unshaded slices (C) shown in FIG. 25 need not be transmitted.

It is noted that not all LR pictures have to provide such intra slice coding. For example, assuming a transmission pattern for LR pictures such as: LRI LRI LRI LR LR LR, where the 'I' superscript indicates presence of an intra slice, then the server must cache not only the intra slices and their dependent slices in the LRI pictures, but also the dependent slices in the LR pictures that follow.

The technique can be extended to high-resolution synchronization. For example, after synchronization to the base layer as described above, the receiver can initially display the upsampled base layer information. At the same time, it can initiate the same process in the enhancement (S) layer (through SRI pictures). Note that these pictures need not necessarily be cached at the SVCS, but rather the encoder can be instructed to start generating them as soon as a receiver is added to a session. Since the recovery point will be determined by the cached base layer, this will not increase the synchronization time. It will only affect the initial video quality seen by the receiver. FIG. 26 shows this high-resolution synchronization process using an example in which the LR pictures are composed of three slices.

With reference to FIG. 26, the SVCS caches a full cycle 2610 of LRI pictures, as well as following LR pictures (2610'). When a client joins (e.g., at point A), the SVCS transmits all cached LR pictures as quickly as possible to the receiver. Upon decoding all of these pictures, the receiver is now in sync (e.g., at point B) and can start regular decoding of the LR stream. It can also display the decoded pictures upsampled to the high resolution. At the same time, at point A the encoder is notified to generate SRI pictures 2620. These start arriving at the receiver at point C. As soon as a full cycle of SRI pictures is received (e.g., at point D), the receiver can switch from displaying upsampled base layer pictures to displaying decoded full resolution pictures. Although LR recovery is accomplished by decoding faster than real-time, SR recovery is accomplished by decoding in real-time. In this example, the receiver is able to produce a display output at point B (albeit at lower quality). It will be understood that different timings or rates for SR recovery may be used in accordance with the principles of the present invention. For example, bandwidth permitting, the SR recovery can be fast forwarded along side the LR recovery. Furthermore, intra macroblocks can be present in the SR frames at all times and not just initiated on demand as may be appropriate for large conferences or ones associated with frequent resolution changes. Finally, if the LR frame is already decoded in the receiver, only the information required to fast forward the SR level may be provided to the decoder.

The decoder can be instructed on the correct time to start displaying pictures using the Recovery Point SEI message as defined in the H.264 specification. The parameters recovery_frame_cnt and exact_match_flag can be used to indicate the frame number at which recovery is complete, and if the match with the encoder is exact or not.

In cases where the intra macroblocks were reduced such that a large number of LR/SR frames are required for refresh the fast-forward method will require sending a large number of LR/SR frames resulting in total bandwidth usage which may be larger than one I frame of comparable quality. Further, in many video switching techniques (e.g. voice activation switching) many receivers will need to switch to the same picture in the low or high resolution. In such situations method (a) may be augmented with the server performing the decoding of the R. frames and sending a regular intra frame to the switching or entering receivers (method (c)). This augmented method (a) provides a good tradeoff between lowering the computational overhead associated with the server-based intra frame method, while maintaining the small overhead on endpoints currently subscribed to the stream, and reducing the bandwidth overhead while switching as well the switch time itself.

In further method (d), the fast forward method may be used just to shorten the wait time for synchronization rather then eliminating it completely depending on the constraints in the system. For example if the entering endpoint in a system is bandwidth-limited then it may not be faster to send it all the LR/SR frames needed to synchronize in advance. Instead, for quicker synchronization, the entering endpoint it may be sent or provided with a smaller backlog.

The various techniques and methods described above may be combined or modified as practical. For example, the fast forward method may be applied only to the LR level (lowest spatial/quality resolution) frames, which would then be decoded upsampled for use as a reference for subsequent enhancement layer frames. In practice, the bandwidth, which would subsequently be used to transmit the enhancement layer frames and the CPU to decode them could be used in the synchronization period to faster transmit and decode the LR frames.

In cases where the encoder is not bandwidth limited, the encoder may generate I frames or slices on a periodic basis. The encoder would operate such that the frame just before an I slice or picture will be referenced by the frame just after it. The SVCS may cache such intra information, and withhold forwarding it to endpoints currently receiving this stream, thereby avoiding any overhead. For new participants, the SVCS will provide this I picture, and any following R frames so the new participants can catch up to real time. If further bandwidth is available from an encoder to an SVCS, then it is possible to transmit all LR pictures, and add I slices or pictures as additional, redundant pictures. The redundant pictures would be cached at the SVCS, while the regular LR pictures are forwarded to the recipients. The cached I slices or pictures can be used as described before to assist receivers to sync to the particular stream, while posing no bandwidth overhead on current participants.

The methods described above also can be used in the context of one to many streaming applications that requires low delay and some measure of interactivity and claimed under the present invention A potential drawback of the aforementioned switching technique is that it requires a double decoding loop when switching from low to high resolution. An alternative switching technique requires only a single loop decoding structure. At the time switching from the low to the high resolution is to be effected, the decoder switches to the high resolution decoding loop initialized by reference pictures that were decoded at the lower resolution. From that point forward, the high resolution pictures are decoded and displayed and eventually synchronized with the transmitter via intra macroblocks.

With single loop decoding, it is possible for the video encoder to only encode pictures at the size requested by the participant(s). There are advantages in encoding at multiple resolutions, for example, encoding of a very low resolution picture can be used for error concealment purposes.

Further, in accordance with the present invention spatial and /or SNR scalability can be used for error concealment. For example, assume a single-loop CIF/QCIF encoding. If errors occur on the high resolution, for error concealment the decoder can upsample intra macroblocks of the QCIF resolution and use the available motion vectors, modes, and prediction error coded at the CIF layer. If double loop decoding is possible or can be done on the fly upon detection of an error, the decoder may also use the upsampled decoded QCIF image as reference for future frames and for display purposes. With intra macroblocks being used at the CIF layer and/or a temporal structure that eliminates dependencies on a corrupted picture, the video communications system will quickly recover from the loss.

The same LR scheme shown in FIG. 13 can also be used for robustness purposes. The low resolution LR frames can provide recovery points when packet losses occur at the enhancement layer. The decoded frames can be used as estimates of the high resolution reference picture buffer, or be displayed in lieu of the high resolution frames until the high resolution decoding loop recovers. In combination with intra macroblocks, this can be an effective error resilience technique. Furthermore, one can tradeoff computational load with switching speed. For example, by decoding more of the low resolution layer (e.g., all L0 pictures) there is more and better data for recovery of the high resolution layer. It is also possible to use LR frames for the enhancement layer signal(s).

When more than one spatial or quality resolution is present, as in the picture coding structure of FIG. 13, fast forward recovery and concealment can occur at the same time. For example, when a decoder does not receive a required SR picture, it can decode the following SR and S0-S2 pictures using concealment. When the missing SR picture becomes available through retransmission, the decoder can then re-decode the intervening SR pictures that have been received from the time of the SR loss and may already have been displayed concealed, so that that it produces the correct reference picture for the following SR picture. It is noted that if the SR retransmission is fast enough, and the retransmitted SR arrives prior to the SR picture following the one that was lost, then the decoder can also decode any or all of the SO and S1 pictures that may have already been displayed concealed, if it will allow it to produce the correct reference picture for the picture that it has to decode and display next. If the pictures are structured in slices, then both concealment and fast forward recovery techniques described herein can be applied individually to each of the slices in accordance with the principles of the present invention.

In spatial scalability, there is an interesting interplay between bandwidth efficiency across time and across spatial resolutions. For example, intra macroblocks at the base layer in single-loop decoding can be beneficial in improving the coding efficiency of the high spatial layer(s). Furthermore, experiments have shown that the higher the quality of encoding (i.e., smaller QP values) the lower the effectiveness of motion estimation. Typical sizes for LR frames are twice that of L0 frames, but the size difference decreases with increased quality. Thus for higher resolution and/or picture quality, all L0 frames can be made to use the LR frames as a reference without a significant coding efficiency penalty. Since the LR frames are guaranteed to be reliably received, their use provides a more error-resilient solution without an inordinate penalty in bandwidth.

The choice between the use of LR pictures and intra macroblocks for a video communication system may depend on the particular network conditions encountered, the number of participants, and several other factors. In order to optimize the efficiency of video communication systems, it may be important to jointly consider the effect of each of these techniques in the decoding process. Ideally, if the encoder is fully aware of the state of the decoder, including lost packets, it is possible to maximize the quality of future frames. This can be accomplished if a tight feedback loop is maintained between the encoder and all decoders. This is represented by RRC module 530 (FIG. 6). Feedback can be provided at all levels, e.g., from individual macroblock, slice, picture, or entire layer.

RRC module 530 may be configured to coordinate the encoder's decision in terms of mode selection, motion vector selection, etc., together with reference picture selection (normal or LR reference) and the statistics of the forced intra macroblock coding process. Furthermore, RRC module 530 may be configured to maintain state information regarding the safe vs. unsafe portions of the frame that can be used for motion compensated prediction. These decisions are made in a joint fashion with the encoder. The more detailed feedback is made available to the encoder, the better decisions it can make.

If the encoder knows the error concealment strategy employed at the decoder, then assuming feedback is used the encoder will be capable of computing the exact state of the decoder even in the presence of packet errors. If actual packet loss information is not available, the encoder can still use statistical techniques to estimate the probabilistic effect of packet losses and account for packet losses when performing rate-distortion optimization. For example, higher loss rates would result in a larger percentage of intra coded macroblocks.

Similarly, operations such as a new user joining the conference can be brought into the optimization process of the encoder. In this case, the need to provide a random access point for the new user translates to a very high percentage of intra macroblocks at the encoder. With scalable coding, the same phenomenon is observed in layer switching.

For system efficiency, the feedback information managed by the RRC 530 does not have to directly reach a particular encoder. As an alternative, intermediate SVCSs can filter feedback messages and present the encoder with a merged result. Intermediate nodes in the system can also take action on feedback messages. For example, consider the case of NACK messages. A NACK can trigger retransmission from the nearest intermediate node (SVCS). The NACK can propagate all the way to the source, where it is used to track the status of the decoder. This information can cause, for example, the encoder to switch the reference picture index to point to an LR picture (or a picture that it knows it has been properly received and is currently available in the decoder's buffers). The NACK/ACK messaging concept leads directly to the concept of pictures and picture areas that are safe or unsafe to use for motion compensated prediction, which in turn leads naturally to the concept of the LR frames. LR frames with a fixed periodic picture coding structure allow one to dispense with the NACK, and similarly use of a tight NACK/ACK feedback enables a fully dynamic selection of LR pictures.

An alternative to the "push" approach, which the NACK/ACK feedback messages imply, is a "pull" architecture. In a pull architecture, LR packets need not be acknowledged, but instead are buffered at each intermediate SVCS and retransmitted upon request (e.g., like a request for a new I-frame) when endpoints or other downstream servers determine that they have missed an LR packet.

In a variation of this pull architecture, all L0 packets (or otherwise the lowest temporal level of scalable coding scheme already in place for a given application) are buffered at each intermediate SVCS and retransmitted upon request. This variation may leave the endpoint in a mode of always trying to catch-up if it does not have the CPU bandwidth to decode all the L0 packets that have arrived while waiting for a missing L0 packet. However, the advantage of this variation of the pull architecture is that there is no additional overhead of a slightly larger LR frame introduced for the sole purpose of error resilience.

The interval between reliability packets (whether LR or L0) should be determined by the CPU and bandwidth constraints of the weakest participants (endpoint or another server). Reliability packets arriving too frequently can overwhelm an endpoint during recovery. The video communicating system may be configured to signal a participant's recovery ability back to the sender so that the interval between reliability packets can be as small as possible as, but no smaller than, can be handled by the weakest participant.

Integral to the decision making process of the encoder is selection of macroblock coding types (mb_type). This decision takes distortion and rate associated with inter coding given the above considerations into account. Distortion and rate associated with (constrained) intra coding are computed without having to consider multiple decoders. Depending on the choice of the cost function one or more distortion values per spatial resolution and mb_type must be computed.

When the modeling of the decoder status or the cost function is inaccurate, intra macroblock types may be chosen instead or additionally, following a random pattern. The appropriate amount of intra macroblock types can be determined by an estimate of the channel error probability and the amount of concealment energy.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

It also will be understood that the systems and methods of the present invention can be implemented using any suitable combination of hardware and software. The software (i.e., instructions) for implementing and operating the aforementioned systems and methods can be provided on computer-readable media, which can include without limitation, firmware, memory, storage devices, microcontrollers, microprocessors, integrated circuits, ASICS, on-line downloadable media, and other available media.

What is claimed is:

1. A method for video decoding in a decoder of a first coded video bitstream comprising at least a temporal base layer L0 and a temporal enhancement layer L1, L0 comprising at least two coded temporal base layer pictures L0P0 and L0P1, and L1 comprising at least two coded temporal enhancement layer pictures L1P0 and L1P1; the method comprising:

decoding, in order, the coded picture L0P0, the coded picture L1P0, the coded picture L0P1, and the coded picture L1P1;

wherein L0P1 and L1P0 are predicted at least from L0P0, L1P1 is predicted at least from L0P1, and L1P1 is not predicted from L1P0;

wherein L0P0 comprises a header H0, L0P1 comprises a header H1, L1H0 comprises a header H2, L1P1 comprises a header H3;

wherein the headers H0, H1, H2, and H3 each comprises a data element FI at a same position in the header, the data element FI having a pre-determined fixed length and containing a binary coded unsigned number;

wherein for coded pictures of the base layer L0, the binary coded unsigned number is a key picture index and increments by 1 with each coded picture in L0 until the binary coded unsigned number resets to 0 if either FI exceeds a maximum value or the L0 picture is an Independent Decoder Refresh Point (IDR) picture;

wherein for coded pictures in L1, the binary coded unsigned number is equal to the binary coded unsigned number in the data element FI in the most recent, in decoding order, coded picture included in L0.

2. The method of claim 1, wherein the predetermined fixed length is 8 bits.

3. The method of claim 1, wherein L0P0 is an IDR picture, the number in H0 is equal to 0, the number in H1 is 1, the number in H2 is 0, and the number in H3 is 1.

4. The method of claim 1, wherein a second coded bitstream comprises at least a temporal base layer and a temporal enhancement layer, the second coded bitstream's temporal base layer comprising at least three coded temporal base layer pictures B2L0P0 and B2L0P1 and B2L0P2, and the second coded bitstream's temporal enhancement layer comprises at least three coded temporal enhancement layer pictures B2L1P0, B2L1P1, and B2L1P2;

wherein B2L0P1 and B2L1P0 are predicted at least from B2L0P0, B2L0P2 and B2L1P1 are predicted at least from B2L0P1, B2L1P2 is predicted at least from B2L0P2;

wherein B2L1P1 is not predicted from B2L1P0, B2L1P2 is not predicted from B2L1P1;

wherein B2L0P2 comprises a header H4, H4 comprising a data element FI at the same position in the header as the data element FI in the header H1, the data element FI having the predetermined fixed length and containing a binary coded unsigned number;

wherein B2L1P2 comprises a header H5, H5 comprising a data element FI at the same position in the header as the data element FI in the header H1, the data element FI having the pre-determined fixed length and containing a binary coded unsigned number;

wherein the first coded bitstream is derived from the second coded bitstream by removing coded picture B2L0P2, so that:

L0P0 is B2L0P0; L0P1 is B2L0P1;
L1P0 is B2L1P0; L1P1 is B2L1P1;
a coded picture L1P2 is B2L1P2, L1P2 comprising a header H6, wherein H6 comprises a data element FI at the same position in the header as the data element FI in the header H1, the data element FI having the predetermined fixed length and containing a binary coded unsigned number, the binary coded unsigned number in H6 being the same as the number in H5;

the method further comprising detecting the removal of coded picture B2L0P2 by decoding only the header H6.

5. The method of claim 4, wherein the detecting comprises comparing the number in H6 with a stored list of numbers of at least a subset of all headers of all pictures of L0, and wherein the number in FI of the header H6 is not present in the stored list of numbers.

6. The method of claim 5, further comprising creating the stored list of numbers by adding to the stored list of numbers the binary coded unsigned number in the data element FI of the header of each picture in layer L0 after the picture in L0 has been successfully decoded.

7. The method of claim 6, wherein the list is reset to a single entry of the number in the header of the last decoded picture in L0 when the last decoded picture in L0 is an IDR picture.

8. The method of claim 5, further comprising, upon detecting the removal of coded picture L0P2, creating a negative acknowledgement (NACK) message, the NACK message including information indicative of L1P2.

9. The method of claim 8, wherein, the information indicative of L1P2 is the binary coded unsigned number FI of the header of L1P2.

10. The method of claim 8, further comprising transmitting the NACK message to at least one of a sending endpoint and a sending server.

11. The method of claim 10, wherein one of the sending endpoint or the sending server transmitted the second bitstream, and the removal of the picture L0P2 is the result of a data loss during the transmission from the one of the sending endpoint or the sending server to the decoder.

12. The method of claim 1, wherein each header is a Real-time Transport Protocol (RTP) payload format header.

13. The method of claim 1, wherein each header is a Network Abstraction Layer (NAL) unit header.

14. A non-transitory computer-readable medium for video decoding of a first coded video bitstream comprising at least a temporal base layer L0 and a temporal enhancement layer L1, L0 comprising at least two coded temporal base layer pictures L0P0 and L0P1, and L1 comprising at least two coded temporal enhancement layer pictures L1P0 and L1P1; the non-transitory computer-readable medium comprising executable instructions to direct a processor to:
   decode, in order, the coded picture L0P0, the coded picture L1P0, the coded picture L0P1, and the coded picture L1P1;
   wherein L0P1 and L1P0 are predicted at least from L0P0, L1P1 is predicted at least from L0P1, and L1P1 is not predicted from L1P0;
   wherein L0P0 comprises a header H0, L0P1 comprises a header H1, L1H0 comprises a header H2, L1P1 comprises a header H3;
   wherein the headers H0, H1, H2, and H3 each comprises a data element FI at a same position in the header, the data element FI having a pre-determined fixed length and containing a binary coded unsigned number;
   wherein for coded pictures of the base layer L0, the binary coded unsigned number is a key picture index and increments by 1 with each coded picture in L0 until the binary coded unsigned number resets to 0 if either FI exceeds a maximum value or the L0 picture is an Independent Decoder Refresh Point (IDR) picture;
   wherein for coded pictures in L1, the binary coded unsigned number is equal to the binary coded unsigned number in the data element FI in the most recent, in decoding order, coded picture included in L0.

15. The non-transitory computer-readable medium of claim 14, wherein the predetermined fixed length is 8 bits.

16. The non-transitory computer-readable medium of claim 14, wherein L0P0 is an IDR picture, the number in H0 is equal to 0, the number in H1 is 1, the number in H2 is 0, and the number in H3 is 1.

17. The non-transitory computer-readable medium of claim 14, wherein a second coded bitstream comprises at least a temporal base layer and a temporal enhancement layer, the second coded bitstream's temporal base layer comprising at least three coded temporal base layer pictures B2L0P0 and B2L0P1 and B2L0P2, and the second coded bitstream's temporal enhancement layer comprises at least three coded temporal enhancement layer pictures B2L1P0, B2L1P1, and B2L1P2;
   wherein B2L0P1 and B2L1P0 are predicted at least from B2L0P0, B2L0P2 and B2L1P1 are predicted at least from B2L0P1, B2L1P2 is predicted at least from B2L0P2;
   wherein B2L1P1 is not predicted from B2L1P0, B2L1P2 is not predicted from B2L1P1;
   wherein B2L0P2 comprises a header H4, H4 comprising a data element FI at the same position in the header as the data element FI in the header H1, the data element FI having the predetermined fixed length and containing a binary coded unsigned number;
   wherein B2L1P2 comprises a header H5, H5 comprising a data element FI at the same position in the header as the data element FI in the header H1, the data element FI having the pre-determined fixed length and containing a binary coded unsigned number;
   wherein the first coded bitstream is derived from the second coded bitstream by removing coded picture B2L0P2, so that:
   L0P0 is B2L0P0; L0P1 is B2L0P1;
   L1P0 is B2L1P0; L1P1 is B2L1P1;
   a coded picture L1P2 is B2L1P2, L1P2 comprising a header H6,
   wherein H6 comprises a data element FI at the same position in the header as the data element FI in the header H1, the data element FI having the predetermined fixed length and containing a binary coded unsigned number, the binary coded unsigned number in H6 being the same as the number in H5;
   the non-transitory computer-readable medium further comprising executable instructions to direct the processor to detect the removal of coded picture B2L0P2 by decoding only the header H6.

18. The non-transitory computer-readable medium of claim 17, wherein the detecting comprises comparing the number in H6 with a stored list of numbers of at least a subset of all headers of all pictures of L0, and wherein the number in FI of the header H6 is not present in the stored list of numbers.

19. The non-transitory computer-readable medium of claim 18, further comprising executable instructions to direct the processor to create the stored list of numbers by adding to the stored list of numbers the binary coded unsigned number in the data element FI of the header of each picture in layer L0 after the picture in L0 has been successfully decoded.

20. The non-transitory computer-readable medium of claim 19, wherein the list is reset to a single entry of the number in the header of the last decoded picture in L0 when the last decoded picture in L0 is an IDR picture.

21. The non-transitory computer-readable medium of claim 18, further comprising executable instructions to direct the processor to, upon detecting the removal of coded picture L0P2, create a negative acknowledgement (NACK) message, the NACK message including information indicative of L1P2.

22. The non-transitory computer-readable medium of claim 21, wherein, the information indicative of L1P2 is the binary coded unsigned number FI of the header of L1P2.

23. The non-transitory computer-readable medium of claim 21, further comprising executable instructions to direct the processor to transmit the NACK message to at least one of a sending endpoint and a sending server.

24. The non-transitory computer-readable medium of claim 23, wherein one of the sending endpoint or the sending server transmitted the second bitstream, and the removal of the picture L0P2 is the result of a data loss during the transmission from the one of the sending endpoint or the sending server to the decoder.

25. The non-transitory computer-readable medium of claim 14, wherein each header is a Real-time Transport Protocol (RTP) payload format header.

26. The non-transitory computer-readable medium of claim 14, wherein each header is a Network Abstraction Layer (NAL) unit header.

27. A system for video decoding, comprising:
   a decoder for decoding of a first coded video bitstream comprising at least a temporal base layer L0 and a temporal enhancement layer L1, L0 comprising at least two coded temporal base layer pictures L0P0 and L0P1, and L1 comprising at least two coded temporal enhancement layer pictures L1P0 and L1P1; the decoder configured to:
decode, in order, the coded picture L0P0, the coded picture L1P0, the coded picture L0P1, and the coded picture L1P1;
wherein L0P1 and L1P0 are predicted at least from L0P0, L1P1 is predicted at least from L0P1, and L1P1 is not predicted from L1P0;
wherein L0P0 comprises a header H0, L0P1 comprises a header H1, L1H0 comprises a header H2, L1P1 comprises a header H3;
wherein the headers H0, H1, H2, and H3 each comprises a data element FI at a same position in the header, the data element FI having a pre-determined fixed length and containing a binary coded unsigned number;
wherein for coded pictures of the base layer L0, the binary coded unsigned number is a key picture index and increments by 1 with each coded picture in L0 until the binary coded unsigned number resets to 0 if either FI exceeds a maximum value or the L0 picture is an Independent Decoder Refresh Point (IDR) picture;
wherein for coded pictures in L1, the binary coded unsigned number is equal to the binary coded unsigned number in the data element FI in the most recent, in decoding order, coded picture included in L0.

28. The system of claim 27, wherein the predetermined fixed length is 8 bits.

29. The system of claim 27, wherein L0P0 is an IDR picture, the number in H0 is equal to 0, the number in H1 is 1, the number in H2 is 0, and the number in H3 is 1.

30. The system of claim 27, wherein a second coded bitstream comprises at least a temporal base layer and a temporal enhancement layer, the second coded bitstream's temporal base layer comprising at least three coded temporal base layer pictures B2L0P0 and B2L0P1 and B2L0P2, and the second coded bitstream's temporal enhancement layer comprises at least three coded temporal enhancement layer pictures B2L1P0, B2L1P1, and B2L1P2;
wherein B2L0P1 and B2L1P0 are predicted at least from B2L0P0, B2L0P2 and B2L1P1 are predicted at least from B2L0P1, B2L1P2 is predicted at least from B2L0P2;
wherein B2L1P1 is not predicted from B2L1P0, B2L1P2 is not predicted from B2L1P1;
wherein B2L0P2 comprises a header H4, H4 comprising a data element FI at the same position in the header as the data element FI in the header H1, the data element FI having the predetermined fixed length and containing a binary coded unsigned number;
wherein B2L1P2 comprises a header H5, H5 comprising a data element FI at the same position in the header as the data element FI in the header H1, the data element FI having the pre-determined fixed length and containing a binary coded unsigned number;
wherein the first coded bitstream is derived from the second coded bitstream by removing coded picture B2L0P2, so that:
L0P0 is B2L0P0; L0P1 is B2L0P1;
L1P0 is B2L1P0; L1P1 is B2L1P1;
a coded picture L1P2 is B2L1P2, L1P2 comprising a header H6,
wherein H6 comprises a data element FI at the same position in the header as the data element FI in the header H1, the data element FI having the predetermined fixed length and containing a binary coded unsigned number, the binary coded unsigned number in H6 being the same as the number in H5;
the decoder further configured to detect the removal of coded picture B2L0P2 by decoding only the header H6.

* * * * *